(12) United States Patent
Hu et al.

(10) Patent No.: US 8,605,684 B2
(45) Date of Patent: Dec. 10, 2013

(54) SYSTEM AND METHOD FOR COORDINATED MULTI-POINT NETWORK OPERATION TO REDUCE RADIO LINK FAILURE

(75) Inventors: Rose Qingyang Hu, Allen, TX (US); Zhijun Cai, Irving, TX (US); Yi Yu, Irving, TX (US); Yi Song, Irving, TX (US)

(73) Assignee: BlackBerry Limited, Waterloo (CA)

( * ) Notice: Subject to any disclaimer, the term of this patent is extended or adjusted under 35 U.S.C. 154(b) by 382 days.

(21) Appl. No.: 12/684,665

(22) Filed: Jan. 8, 2010

(65) Prior Publication Data
US 2011/0170516 A1 Jul. 14, 2011

(51) Int. Cl.
*H04W 4/00* (2009.01)
*H04W 36/00* (2009.01)

(52) U.S. Cl.
CPC .................. *H04W 36/0033* (2013.01)
USPC .......................... 370/332; 455/436

(58) Field of Classification Search
USPC ......... 370/329, 330, 331, 333, 468, 216–228, 370/395.21, 242, 245; 455/442, 436, 439, 455/452, 524, 525, 134, 135, 115.3, 226.2, 455/501, 550, 437, 422, 562.1
See application file for complete search history.

(56) References Cited

U.S. PATENT DOCUMENTS

| | | | |
|---|---|---|---|
| 8,140,076 B2 * | 3/2012 | Ponce de Leon et al. .... 455/437 | |
| 2008/0019320 A1 | 1/2008 | Phan et al. | |
| 2008/0186892 A1 | 8/2008 | Damnjanovic | |
| 2008/0227456 A1 * | 9/2008 | Huang et al. .................. | 455/436 |
| 2008/0261600 A1 | 10/2008 | Somasundaram et al. | |
| 2009/0061878 A1 | 3/2009 | Fischer | |
| 2010/0173660 A1 * | 7/2010 | Liu et al. ....................... | 455/501 |
| 2010/0177746 A1 | 7/2010 | Gorokhov et al. | |
| 2011/0038329 A1 | 2/2011 | Luo et al. | |
| 2011/0080879 A1 * | 4/2011 | Grant ............................ | 370/329 |
| 2011/0170422 A1 * | 7/2011 | Hu et al. ....................... | 370/242 |
| 2011/0183669 A1 | 7/2011 | Kazmi | |

OTHER PUBLICATIONS

European Search Report dated Jun. 8, 2011, in corresponding application No. 11150422.1.

(Continued)

*Primary Examiner* — Hanh N Nguyen
(74) *Attorney, Agent, or Firm* — Novak Druce Connolly Bove + Quigg LLP

(57) ABSTRACT

A system and method for implementing call handover (HO) is disclosed. A user equipment (UE) is configured to communicate with a wireless communication network. The UE is configured to transmit a measurement report to at least one of a serving cell and at least one cell of a coordinated multi-point (CoMP) cell set. The UE is also configured to listen for control channel transmissions from at least one of the serving cell and a first cell in the CoMP cell set, receive a resource allocation from at least one of the serving cell and the first cell in the CoMP cell set, and receive an HO command jointly from the serving cell and the first cell in the CoMP cell set. The HO command identifies a target cell. The UE is also configured to perform handover to the target cell identified in the HO command.

27 Claims, 13 Drawing Sheets

(56) References Cited

OTHER PUBLICATIONS

Research in Motion UK Limited: "Discussion of Handover for Comp", 3GPP Draft; R2-094282, 3rd Generation Partnership Project (3GPP), Mobile Competence Centre; 650, Route DES Lucioles; F-06921 Sophia-Antipolis CEDEX, France, no. Shenzhea, China; 20090817, Aug. 17, 2009, XP050352526, (retrieved on Aug. 17, 2009).

CATT: "Impact of Comp on Control Plant", 3GPP Draft; R-2-095488, 3rd Generation Partnership Project (3GPP), Mobile Competence Centre; 650, Route DES Lucioles; F-06921 Sophia-Antipolis CEDEX; France, no. Miyazaki; 20091012, Oct. 12, 2009, XP050390044, (retrived on Oct. 4, 2009).

Huawei: "Rach-less nandover in Comp", 3GPP Draft; R2-093929, 3rd Generation Partnership Project (3GPP), Mobile Competence Centre; 650, Route DES Lucioles; F-06921 Sophia-Antipolis Cedex; France, no. Los Angeles, USA; 20090623, Jun. 23, 2009, XP050352121, (retrived on Jun. 23, 2009).

3rd Generation Partnership Project ; Technical Specification Group Radio Access Network; Further Advancements for E- Utraphysical Layer Aspects (Release 9), 3GPP Draft; TR 36.814_150, 3rd Generation partnership project (3GPP), mobile competence centre; 650, route des Lucioles; F-06921 Sophia-Antipolis Cedex; France, no. Jeju; 20091109, Nov. 1, 2009. XP050389446, (retrieved on Nov. 13, 2009).

Huawei: RAN2 considerations for coordinated multipoint transmission and reception, 3GPP Draft ; R2-093107 RAN2 Considerations for Comp, 3rd Generation Partnership Project(3GPP), Mobile Competence Centre; 650, Route DES Lucioles; F-06921 Sophia-Antipolis Cedex; France, no. San Francisco, USA; 20090428, Apr. 28, 2009, XP050340849, (retrived on Apr. 28, 2009), XP050340849, retrieved on Apr. 28, 2009.

Catt: "Impact of Compto RRC Specification", 3GPP Draft; R2-092990, 3rd Generation Partnership Project (3GPP), Mobile Competence Centre; 650, Route DES Lucioles; F-06921 Sophia-Antipolis Cedex; France, no. San Francisco, USA; 20090428, Apr. 28, 2009, XP050340774, (retrieved on Apr. 28, 2009).

\* cited by examiner

SYSTEM AND METHOD FOR COORDINATED MULTI-POINT NETWORK OPERATION TO REDUCE RADIO LINK FAILURE

BACKGROUND

The present invention relates generally to data transmission in communication systems and more specifically to methods and systems for uplink (UL) and downlink (DL) coordinated multi-point transmission (CoMP) to reduce radio link failure (RLF) during an inter-base station or cell handover.

As used herein, the terms "user agent" and "UA" can refer to wireless devices such as mobile telephones, personal digital assistants (PDAs), handheld or laptop computers, and similar devices or other User Equipment ("UE") that have telecommunications capabilities. In some embodiments, a UE may refer to a mobile, wireless device. The term "UE" may also refer to devices that have similar capabilities but that are not generally transportable, such as desktop computers, set-top boxes, or network nodes. Generally, throughout the present disclosure the terms UE and UA are interchangeable.

In traditional wireless telecommunications systems, transmission equipment in a base station or other network node transmits signals throughout a geographical region known as a cell. As technology has evolved, more advanced equipment has been introduced that can provide services that were not possible previously. This advanced equipment might include, for example, an evolved universal terrestrial radio access network (E-UTRAN) node B (eNB) rather than a base station or other systems and devices that are more highly evolved than the equivalent equipment in a traditional wireless telecommunications system. Such advanced or next generation equipment may be referred to herein as long-term evolution (LTE) equipment. Additional improvements to LTE systems and equipment will eventually result in an LTE advanced (LTE-A) system. As used herein, the phrase "base station" or "cell" will refer to any component, such as a traditional base station or an LTE or LTE-A base station (including eNBs), that can provide a UE with access to other components in a telecommunications system.

In mobile communication systems such as the E-UTRAN, a base station provides radio access to one or more UEs. The base station comprises a packet scheduler for dynamically scheduling downlink traffic data packet transmissions and allocating uplink traffic data packet transmission resources among all the UEs communicating with the base station. The functions of the scheduler include, among others, dividing the available air interface capacity between UEs, deciding the transport channel to be used for each UE's packet data transmissions, and monitoring packet allocation and system load. The scheduler dynamically allocates resources for Physical Downlink Shared CHannel (PDSCH) and Physical Uplink Shared CHannel (PUSCH) data transmissions, and sends scheduling information to the UEs through a control channel.

To facilitate communications, a plurality of different communication channels are established between a base station and a UE including, among other channels, a Physical Downlink Control Channel (PDCCH). As the label implies, the PDCCH is a channel that allows the base station to control the UE during downlink data communications. To this end, the PDCCH is used to transmit scheduling assignment or control data packets referred to as Downlink Control Information (DCI) packets to the UE to indicate scheduling to be used by the UE to receive downlink communication traffic packets on a Physical Downlink Shared Channel (PDSCH) or transmit uplink communication traffic packets on Physical Uplink Shared Channel (PUSCH) or specific instructions to the UE (e.g. power control commands, an order to perform a random access procedure, or a semi-persistent scheduling activation or deactivation). A separate DCI packet may be transmitted by the base station to the UE for each traffic packet/sub-frame transmission.

It is generally desirable to provide a high data rate coverage using signals that have a high Signal to Interference Plus Noise ratio (SINR) for UEs serviced by a base station. Typically, only those UEs that are physically close to a base station can operate with a very high data rate. Also, to provide high data rate coverage over a large geographical area at a satisfactory SINR, a large number of base stations are generally required. As the cost of implementing such a system can be prohibitive, research is being conducted on alternative techniques to provide wide area, high data rate service.

Coordinated multi-point (CoMP) transmission and reception may be used to increase transmission data rate and/or signal quality in wireless communication networks such as LTE-A networks. Using CoMP, neighboring base stations coordinate to improve the user throughput or signal quality, especially for users at a cell edge. CoMP may be implemented using a combination of base stations such as eNBs, and/or relay nodes (RN) and/or other types of network nodes and/or cells.

FIG. 1 is an illustration of an exemplary architecture for an LTE network implementing CoMP to provide UE 10 with an improved SINR. As shown in FIG. 1, UE 10 is either located within or close to the zones of radio coverage (e.g., cells) of each of base stations 100, 102, and 104. Because UE 10 is close to each of the cells established by the base stations, UE 10 is able to receive a signal broadcast by each of the base stations. The channels are indicated by the labels $H_{11}$, $H_{21}$, and $H_{31}$ in FIG. 1.

In LTE-A, for example, CoMP can be used to improve the throughput for cell edge UEs as well as the cell average throughput. There are two primary mechanisms in which CoMP transmissions may be implemented to recognize these improvements. First, CoMP transmissions may provide coordinated scheduling, where data is transmitted to a single UE from one of the available transmission points (e.g., one of base stations 100, 102 and 104 on FIG. 1) and scheduling decisions are coordinated to control, for example, the interference generated in a set of coordinated cells. Secondly, CoMP transmissions may provide joint processing where data is simultaneously transmitted to a single UE from multiple transmission points, for example, to (coherently or non-coherently) improve the received signal quality and/or actively cancel interference for other UEs.

In the case of coordinated scheduling, data is only transmitted by the serving cell, but the scheduling decisions are made with coordination among the neighboring cells. In the case of joint processing CoMP transmission, multiple base stations transmit the data to the same user. The UE then jointly processes the transmissions from multiple nodes to achieve a performance gain.

In an LTE network, radio link failure can happen during a handover procedure, such as that described in TS 36.300 v V8.8.0, "Evolved Universal Terrestrial Radio Access (E-UTRA) and Evolved Universal Terrestrial Radio Access Network (E-UTRAN); Overall description; Stage 2 (Rel 8)". Radio link failure may be due to several factors, including rapid radio channel degradation (e.g., due to sudden co-channel interference, or a UE operating near sensitivity limits). If the channel conditions deteriorate so fast that the UE is unable to process or receive a handover command, the UE initiates the radio link recovery process. Currently, when a UE enters the radio link recovery state, depending on whether the target base station has been prepared, the UE has several options. For example, FIG. 2 illustrates defined phases that occur during a radio link recovery process. After the UE detects the radio link problem at point 106, the UE enters a first phase of radio link recovery by starting timer T1 in step 108. If the UE cannot recover the radio link before T1 expires, the UE considers the radio link to have failed and enters a UE-based mobility condition.

During UE-based mobility, the UE starts a second timer T2 in step 110 and attempts to access a new cell to re-establish the radio link by connecting to a new base station. The new base station is selected based on the UE's prior monitoring of network conditions (e.g., the UE will attempt to connect to the base station having the strongest radio link with the UE). If the new base station has already received the UE context from the original serving base station or cell (the base station or cell that suffered from the radio link failure), the UE may stay in an RRC_Connected state and continue handover procedure and establish the radio link with the new base station in step 112. If, however, the new base station has not previously received the UE context from the original serving base station or cell, the UE may go into an RRC_IDLE state. At that point, the UE goes on to perform a normal IDLE mode to ACTIVE mode transition to the new cell. The IDLE mode to ACTIVE mode transition may lead to a longer interruption time in the range of hundreds of milliseconds to several seconds longer than normal handover.

With the introduction of CoMP technology, the data transmission quality can be improved, especially at the cell edge. However, the current CoMP techniques only apply to data channels. As a result, the control channel is only provided by the serving base station or cell. Consequently, conventional implementations of CoMP only assist with the reduction of data channel radio link failure, but do not mitigate control channel radio link failures.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
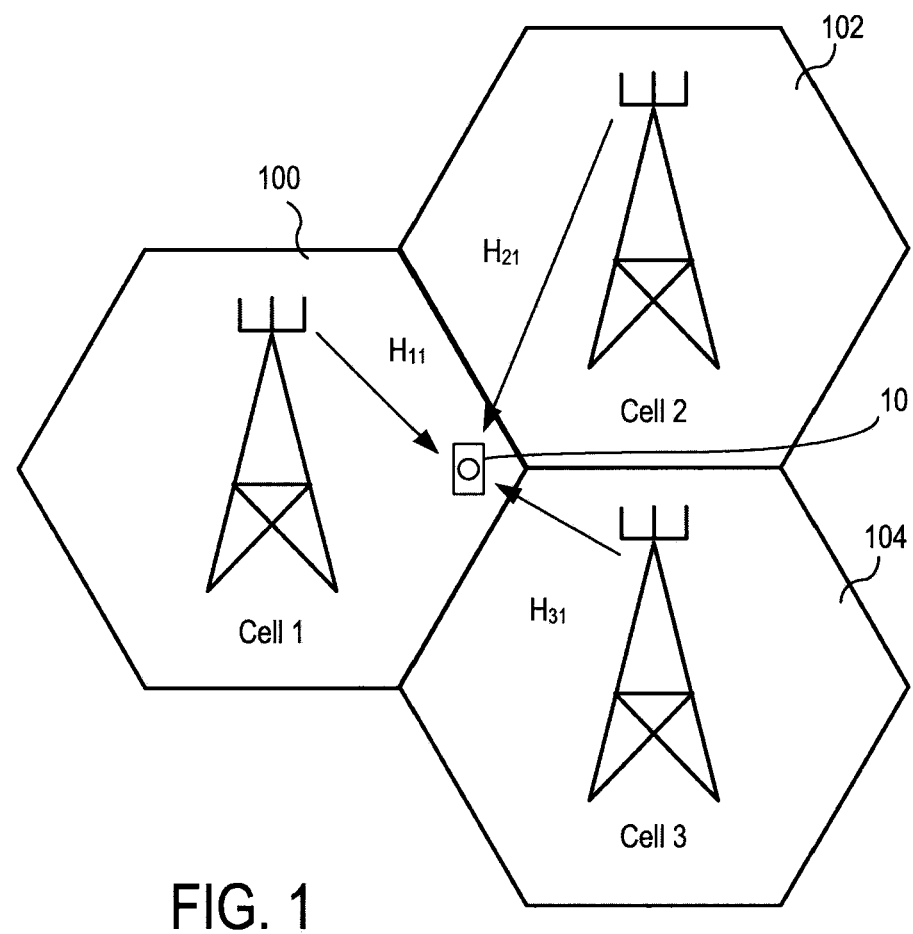
FIG. 1 is an illustration of an exemplary architecture for a long-term evolution (LTE) network implementing coordinated multi-point (CoMP) transmission to provide a user equipment (UE) with an improved signal to interference plus noise ratio (SINR)

The present invention relates generally to data transmission in communication systems and more specifically to methods and systems for uplink (UL) and downlink (DL) coordinated multi-point transmission (CoMP) to reduce radio link failure (RLF) during an inter-base station or cell handover.

Some embodiments include a method of implementing call handover (HO) using a user equipment (UE) configured to communicate with a wireless communication network. The method includes transmitting a measurement report to at least one of a serving cell and at least one cell of a coordinated multi-point (CoMP) cell set. The measurement report includes a downlink (DL) signal quality indication of one or more cells in the CoMP cell set. The method includes listening for control channel transmissions from at least one of the serving cell and a first cell in the CoMP cell set, receiving a resource allocation from at least one of the serving cell and the first cell in the CoMP cell set, and receiving an HO command jointly from the serving cell and the first cell in the CoMP cell set. The HO command identifies a target cell. The method includes performing handover to the target cell identified in the HO command.

Other embodiments include a method of implementing call handover (HO) using a base station configured to communicate with a wireless communication network. The method includes receiving a measurement report from at least one of a user equipment (UE) and a cell in a coordinated multi-point (CoMP) cell set. The measurement report includes a downlink (DL) signal level between one or more cells of the CoMP cell set and the UE. The method includes transmitting at least one of a DL allocation for a handover command message (HCM) and an HCM context to a first cell in the CoMP cell set, and transmitting an HO command to the UE, the HO command identifying a target cell.

Other embodiments include a method of implementing call handover (HO) using one of a plurality of cells of a coordinated multi-point (CoMP) cell set configured to communicate with a wireless communication network. The method includes receiving at least one of a downlink (DL) allocation for a handover command message (HCM) and an HCM context from a serving cell, and transmitting an HO command to a user equipment (UE), the HO command identifying a target cell.

Other embodiments include a user equipment (UE) configured to implement call handover (HO). The UE includes a processor configured to transmit a measurement report to at least one of a serving cell and at least one cell of a coordinated multi-point (CoMP) cell set. The measurement report includes a downlink (DL) signal quality indication of one or more cells in the CoMP cell set. The processor is configured to listen for control channel transmissions from at least one of the serving cell and a first cell in the CoMP cell set, receive a resource allocation from at least one of the serving cell and the first cell in the CoMP cell set, and receive an HO command jointly from the serving cell and the first cell in the CoMP cell set. The HO command identifies a target cell. The processor is configured to perform handover to the target cell identified in the HO command.

Other embodiments include a base station configured to implement call handover (HO). The base station includes a processor configured to receive a measurement report from at least one of a user equipment (UE) and a cell in a coordinated multi-point (CoMP) cell set. The measurement report includes a downlink (DL) signal level between one or more cells of the CoMP cell set and the UE. The processor is configured to transmit at least one of a DL allocation for a handover command message (HCM) and an HCM context to a first cell in the CoMP cell set, and transmit an HO command to the UE, the HO command identifying a target cell.

Other embodiments include a base station configured to implement call handover (HO). The base station includes a processor configured to receive at least one of a downlink (DL) allocation for a handover command message (HCM) and an HCM context from a serving cell, and transmit an HO command to a user equipment (UE), the HO command identifying a target cell.

Other embodiments include a method of implementing call handover (HO) using a user equipment (UE) configured to communicate with a wireless communication network. The method includes transmitting a measurement report to at least one of a serving cell and at least one cell of a coordinated multi-point (CoMP) cell set. The measurement report includes a downlink (DL) signal level between one or more cells in the CoMP cell set and the UE. The method includes listening for an HO command from a serving cell. The HO command identifies a target cell. The method includes detecting a radio link failure between the UE and the serving cell, listening for an HO command from a first cell in the CoMP cell set for a first time duration, and, when an HO command is received from the first cell in the CoMP cell set within the first time duration, performing handover to the target cell identified in the HO command.

Other embodiments include a method of implementing call handover (HO) using a base station configured to communicate with a wireless communication network. The method includes receiving a measurement report from at least one of a user equipment (UE) and a cell in a coordinated multi-point (CoMP) cell set. The measurement report includes a downlink (DL) signal level between one or more cells of the CoMP cell set and the UE. The method includes transmitting a handover command message (HCM) to a first cell in the CoMP cell set, transmitting a handover proxy message to a first cell in the CoMP cell set, and transmitting an HO command to the UE, the HO command identifying a target cell.

Other embodiments include a method of implementing call handover (HO) using one of a plurality of cells of a coordinated multi-point (CoMP) cell set configured to communicate with a wireless communication network. The method includes receiving a handover proxy message from a serving cell, receiving a handover command message (HCM) from the serving cell, and, after a first time duration, transmitting an HO command to a user equipment (UE) for a second time duration. The HO command identifies a target cell.

Other embodiments include a user equipment (UE) configured to implement call handover (HO). The UE includes a processor configured to transmit a measurement report to at least one of a serving cell and at least one cell of a coordinated multi-point (CoMP) cell set. The measurement report includes a downlink (DL) signal level between one or more cells in the CoMP cell set and the UE. The processor is configured to listen for an HO command from a serving cell. The HO command identifying a target cell. The processor is configured to detect a radio link failure between the UE and the serving cell, listen for an HO command from a first cell in the CoMP cell set for a first time duration, and, when an HO command is received from the first cell in the CoMP cell set within the first time duration, perform handover to the target cell identified in the HO command.

Other embodiments include a base station configured to implement call handover (HO). The base station includes a processor configured to receive a measurement report from at least one of a user equipment (UE) and a cell in a coordinated multi-point (CoMP) cell set. The measurement report includes a downlink (DL) signal level between one or more cells of the CoMP cell set and the UE. The processor is configured to transmit a handover command message (HCM) to a first cell in the CoMP cell set, transmit a handover proxy message to a first cell in the CoMP cell set, and transmit an HO command to the UE, the HO command identifying a target cell.

Other embodiments include a base station configured to implement call handover (HO). The base station includes a processor configured to receive a handover proxy message from a serving cell, receive a handover command message (HCM) from the serving cell, and after a first time duration, transmit an HO command to a user equipment (UE) for a second time duration. The HO command identifies a target cell.

To the accomplishment of the foregoing and related ends, the invention, then, comprises the features hereinafter fully described. The following description and the annexed drawings set forth in detail certain illustrative aspects of the invention. However, these aspects are indicative of but a few of the various ways in which the principles of the invention can be employed. Other aspects and novel features of the invention will become apparent from the following detailed description of the invention when considered in conjunction with the drawings.

The various aspects of the subject invention are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

As used herein, the terms "component," "system" and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs.

Furthermore, the disclosed subject matter may be implemented as a system, method, apparatus, or article of manufacture using standard programming and/or engineering techniques to produce software, firmware, hardware, or any combination thereof to control a computer or processor based device to implement aspects detailed herein. The term "article of manufacture" (or alternatively, "computer program product") as used herein is intended to encompass a computer program accessible from any computer-readable device. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Coordinated multi-point (CoMP) transmission and reception may be used to increase transmission data rates and/or signal quality in wireless communication networks such as LTE-A networks, especially for the cell edge users. Using CoMP, neighboring base stations may coordinate to improve the user throughput or signal quality by providing multiple transmission points for data. Depending upon the network implementation, multiple network nodes or cells may transmit different data to a single UE to increase the signal bandwidth or data rate to that UE. Alternatively, the different network nodes or cells may be configured to each transmit the same signal to the UE, reinforcing the strength of that signal and thereby improving the transmitted Signal to Interference plus Noise Ratio (SINR). CoMP may be implemented using a combination of eNBs, relay nodes (RN), cells and/or other types of network nodes. CoMP can also be applied to a combination of eNBs, relay nodes (RN), cells and/or other types of network nodes. Several CoMP schemes exist for improving SINR, reducing interference, or improving data rate on a resource served by multiple eNBs, RN or cells.

Unfortunately, although the use of CoMP technology may be used to improve data transmission quality, especially at the cell edge, current CoMP techniques only apply to data channels. As a result, the control channel is only provided by the serving cell. Consequently, conventional implementations of CoMP only assist with the reduction of data channel radio link failure, but do not mitigate control channel radio link failures.

The present system provides an enhanced handover scheme taking advantage of CoMP techniques to mitigate radio link failure by allowing the UE to receive control channels and, corresponding, handover commands and data from multiple base stations and/or cells, or, alternatively, to receive a control signal from a base station or cell having the high DL radio link quality thereby improving control channel reliability. In the present disclosure, CoMP with joint processing may be used in combination with one or more embodiments of the present system to improve UE mobility. The present system differs from control channel CoMP transmission implementations that require two cells to transmit the same control channel signal on the same resource, and does not require the coordination of multiple cells to transmit the control signals on the same physical resources.

In some cases, the examples in the present disclosure presume that when the UE moves to a cell edge and is about to handover, the DL CoMP set and UL CoMP includes at least two cells. One of the cells may include the serving cell and the other cell may be a CoMP cell, for example.

In a traditional cellular network, all of the base stations or cells have the same maximum transmission power. Furthermore, transmission power is reciprocal. Accordingly, if a UE receives a strong DL signal from a base station, that base station receives a strong UL signal from the UE. Also, in traditional networks, the DL CoMP set and UL CoMP set for a UE may consist of the same set of base stations. In future heterogeneous networks, however, due to varying transmission power of different base stations (e.g., macro eNBs and micro eNBs), there may be an imbalanced UL and DL coverage due to the different transmission power. As such, the DL CoMP set and UL CoMP set for a particular UE may not each include the same list of base stations. The present system is configured to operate in both network configurations having either balanced or unbalanced DL and UL CoMP sets. In many cases, the serving cell for a particular UE is the same for both UL and DL and the UL and DL CoMP sets have at least one cell in common.

To facilitate the handover procedure, the UE may periodically send a measurement report to the serving cell. The measurement report identifies the signal strength that the UE perceives of one or more of the base stations or cells included within the UE's CoMP set or another set. During handover, the measurement report may be used to identify the most appropriate base station or cell to which the UE can handover towards.

Radio link failure may occur at three different stages during an inter-base station handover or cell handover. In a first scenario, radio link failure causes one or more measurement reports transmitted by the UE to not be received by the serving cell. In that case, the serving cell is not aware of any handover process and, as such, does not setup a new target cell to which handover can occur. In a second scenario, radio link failure occurs when the serving cell attempts to transmit handover instructions to the UE. In that case, the handover command is not received by the UE. Even so, at least one target cell has been configured by the serving cell. In a third scenario, radio link failure occurs after the UE has detached from the serving cell after receiving the handover command but before the UE is able to access the target cell. As in the second scenario, in this case there exists at least one target cell that has been prepared by the handover request.

Many handover failures are caused by radio link failure occurring as in scenarios one and two described above. In the first scenario, because no target cell has been prepared, the likelihood that the UE will go to RRC_IDLE mode is relatively high—no cell is configured to communicate with the UE. In the second scenario, however, the UE may initiate UE-based mobility and access a new cell independently. If the new cell is a prepared target cell, a normal handover procedure may take place. If, however, the new cell is not prepared for the UE, the UE may have to go to RRC_IDLE mode and start with a cell selection/reselection procedure. In both of these cases (e.g., the new cell is not prepared for the UE), the interruption time may be on the order of hundreds of milliseconds to several seconds. Such a significant delay may lead to a service interruption or even potential call drop.

In one implementation of the present system, the UE is configured to send measurement reports in accordance with a rule-set defined by, for example, system information, specifications, or dedicated signaling from one or more network component such as a base station (e.g., an eNB). The measurement report may include a listing of base stations or cells accessible to the UE and/or their respective DL signal levels. The measurement report transmission may be event triggered or timer based. The UE may send the measurement report using any appropriate communications channel such as the PUSCH. All cells within the UL CoMP set may be configured to listen for the measurement reports broadcasts from the UE. The measurement report includes at least one cell β. In the present disclosure, cell β is defined as the cell within a measurement report that consists of the cell having the strongest DL radio link with the UE.

After the UE transmits a measurement report, the UE is configured to listen to one or more cells for potential handover instructions. The two or more cells may include the serving cell and the strongest DL cell (cell β) as indicated in the measurement report. The UE may listen to the two or more cells for the handover command message (HCM) assignment as well as the HCM itself. By listening for the HCM on both the serving cell and cell β, there is an improved probability that the UE will receive the HCM and be able to establish a radio link with either cell β or another handover target cell identified within the HCM.

In this implementation, the serving cell can receive the measurement report directly from the UE and/or receive the measurement report from other cells, for example, the cells in the UL CoMP set. For example, if the serving cell is unable to receive the measurement report directly from the UE due to radio link failure, the measurement report may be forwarded to the serving cell by one or more cells in the UL CoMP set using, for example, the X2 interface. If the serving cell receives the measurement report first from the UE and then receives additional measurement reports from one or more CoMP cells, the serving cell may either combine the additional measurement reports, or discard the later received measurement reports.

Figure 2:
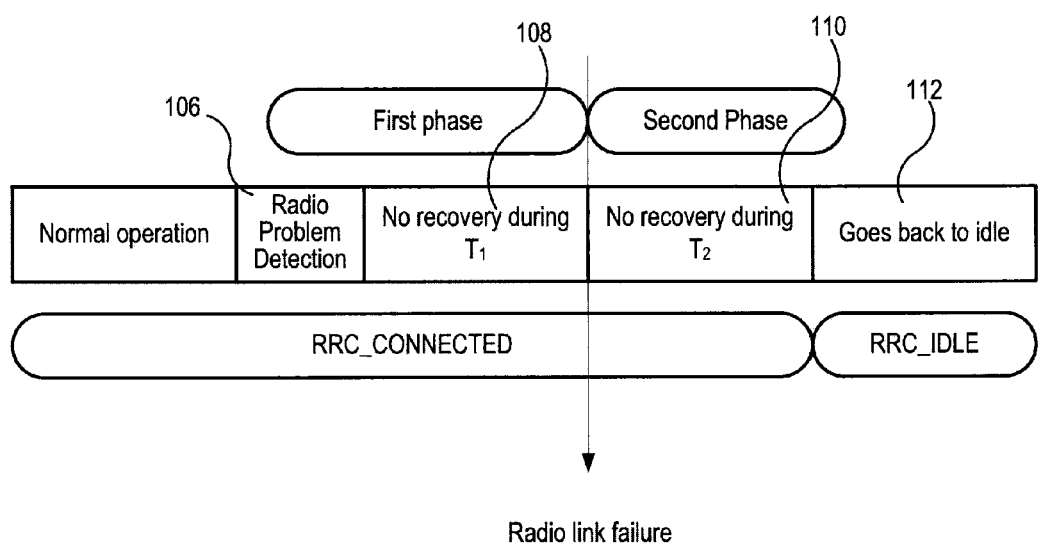
FIG. 2 illustrates several defined phases that occur during an example radio link failure (RLF) recovery process.

After receiving the measurement report, the serving cell may make the handover decision and send the Handover Request to neighboring cells based on existing handover procedures. If the serving cell does not receive any measurement reports, the UE may be configured to trigger the first phase of a Rel.8 RLF recovery process (see element 108 of FIG. 2). If the UE cannot recover the radio link during the first phase, the UE may be configured to trigger the second phase of Rel.8 RLF recovery process (see element 110 of FIG. 2).

In the present system, an exclusive CoMP set Cell Radio Network Temporary Identifier (C-RNTI) may be used to assist the UE in receiving and processing HCMs received from multiple cells. If the UE uses a DL CoMP set indicated by Ω, for example, after the serving cell assigns the UE a first C-RNTI, the serving cell informs other cells in the DL CoMP set Ω that the first C-RNTI shall not be used by any other UEs that are served by any of the cells in the DL CoMP set Ω. In the case that the DL CoMP set and UL CoMP set are not the same, the exclusive C-RNTI may only apply to the DL CoMP set. Alternatively, there may be additional exclusive C-RNTIs associated with the UL CoMP set. When the UE is not in CoMP mode, the exclusive C-RNTI can be released.

The use of an exclusive CoMP-set C-RNTI enables the UE to decode multiple PDCCHs from different cells within the DL CoMP set without the need for a DL control channel CoMP or to receive the PDCCH from the strongest DL CoMP cell (without the need to receive the C-RNTI assignment from the strongest DL CoMP cell first). Accordingly, using the exclusive CoMP set C-RNTI, the UE can monitor the PDCCHs of the serving cell and cell β.

After the serving cell receives the Handover request ACK, the serving cell executes DL resource assignment for the HCM. If cell β is the new target cell, the serving cell forwards the DL assignment information of the HCM to cell β via a communication interface established between the serving cell and the target cell (e.g., cell β) One such interface includes the X2 interface. If, however, cell β is not the new target cell, the serving cell may forward the DL assignment information of the HCM as well as the HCM context (identifying the target cell) to cell β. In either case (where the target cell is cell β or the target cell is another cell in the CoMP set), both the serving cell and cell β may send the DL assignment for the HCM in the PDCCH to the UE. The serving cell and cell β may operate independently, with each cell using their own cell ID and their own resource element (RE) locations within the PDCCH channels.

In some cases, the serving cell and cell β may coordinate the use of PDCCH resources to minimize PDCCH interference for a UE in a lightly loaded system. For example, cell β may reserve the PDCCH resources that are used by the serving cell PDCCH transmission for this UE, and vice versa. In this implementation, the DL assignment messages from the two cells may be scrambled using the same exclusive C-RNTI for the UE, as described above.

In some implementations, the DL assignment of the HCM at the serving cell may need to consider the latency of the X2 interface, as in existing CoMP operations. For example, if the 90th percentile delay of the X2 interface is defined as 'd_X2' milliseconds (ms), the DL assignment of the HCM transmission may have to be located within the subframes at least round (d_X2) Transmission Time Intervals (TTIs) ahead. The serving cell and cell β may then send an HCM using CoMP joint processing mechanism to the UE.

After the UE sends the measurement report, the UE is configured to listen on at least two cells (e.g., the serving cell and cell β), for the HCM assignment as well as for the HCM itself. The HCM may be a CoMP joint transmission from the two cells. As such, the UE may only decode the joint HCM signals carried on the predetermined resource blocks (RBs) from the two cells. For the DL assignment messages, the UE may need to decode two different PDCCH channels; one from the serving cell and one from the DL CoMP cell using the cell's own cell IDs. Because the HCM DL assignment control messages received from the two cells can be carried on the different REs of their own PDCCH channels using different cell IDs, joint detection/decoding may not be possible. Accordingly, the introduction of an exclusive C-RNTI allows the UE to receive and/or decode two different PDCCHs. The UE can read the PDCCH contents from two channels into a buffer first and then execute the PDCCH decoding either sequentially or in parallel.

An example of the implementation may be that the UE first stores the received radio signal into a soft buffer (this implementation may require that synchronization is already achieved for the DL CoMP cells), and the UE then starts decoding two PDCCHs from the two cells using the respective cell IDs and the exclusive C-RNTI. Note that in this example, the UE may also need to know the PHICH configurations in each cell as well as the PCFICH configurations. The reliability of the HCM DL assignment may be improved by the selection diversity.

Alternatively, the HCM DL assignment over the PDCCH may be highly encoded, for example, by repetition code, to increase the PDCCH's reliability. As such, the UE may only need to receive the HCM DL assignment from a single cell rather than multiple cells. In that case, a lower coding rate over the PDCCH (e.g., a higher CCE aggregation level than 8 in Rel 8, or a CCE aggregation level of 16 or 32) may be defined for CoMP operation and whenever the UE is assigned in the CoMP mode. The new CCE aggregation level (16 or 32) may be activated automatically. To maintain the UE's blind decoding complexities including 44 blind decodings, two different CCE aggregation sets may be defined. For example, one set may be for non-CoMP operation, which is the current Rel 8 operation (1, 2, 4, 8). Another set may be for CoMP operation, for example, (2, 4, 8, 16) or (4, 8, 16, 32). In the new set, a higher CCE aggregation level may be included such as 16 or 32. The base station may semi-statically configure the aggregation level and signal to the UE to be used.

After PDCCH decoding, the UE can directly read the composite HCM signal received from the two cells. Because the HCM signal may be received from two cells with one of the cells including cell β, the likelihood that the HCM is received by the UE is greatly increased. If, however, the UE fails to receive the HCM due to poor radio channel conditions, the UE may fall back to the current radio link failure recovery processes such as those defined in Rel.8.

Because UL CoMP cells may only assist in UL reception and may not decode messages that are destined to the serving cell, UL CoMP cells may be configured to forward UL messages, including the measurement report, to the serving cell using, for example, the X2 interface. In that case, the serving cell may decode and combine the received measurement reports. Alternatively, the serving cell may only keep the first received measurement report and discard later-received measurement reports. In some cases, the later-received measurement reports will only be discarded by the serving cell if the serving cell receives a measurement report directly from the UE and can decode the measurement report before the serving cell receives the forwarded measurement reports from one or more UL CoMP cell.

After cell β (the cell having the highest DL radio link with the UE, as specified in the measurement report) receives a DL assignment message and/or the HCM itself from the serving cell, cell β allocates the same PDSCH resources for HCM transmission as indicated in the DL assignment message. Cell β may then send the DL assignment message to the UE using cell β's cell ID and the UE's exclusive C-RNTI, as described above, followed by sending the HCM jointly with the serving node. After receiving the HCM, the handover process may be completed and the UE may become associated with the new target cell.

Figure 3:
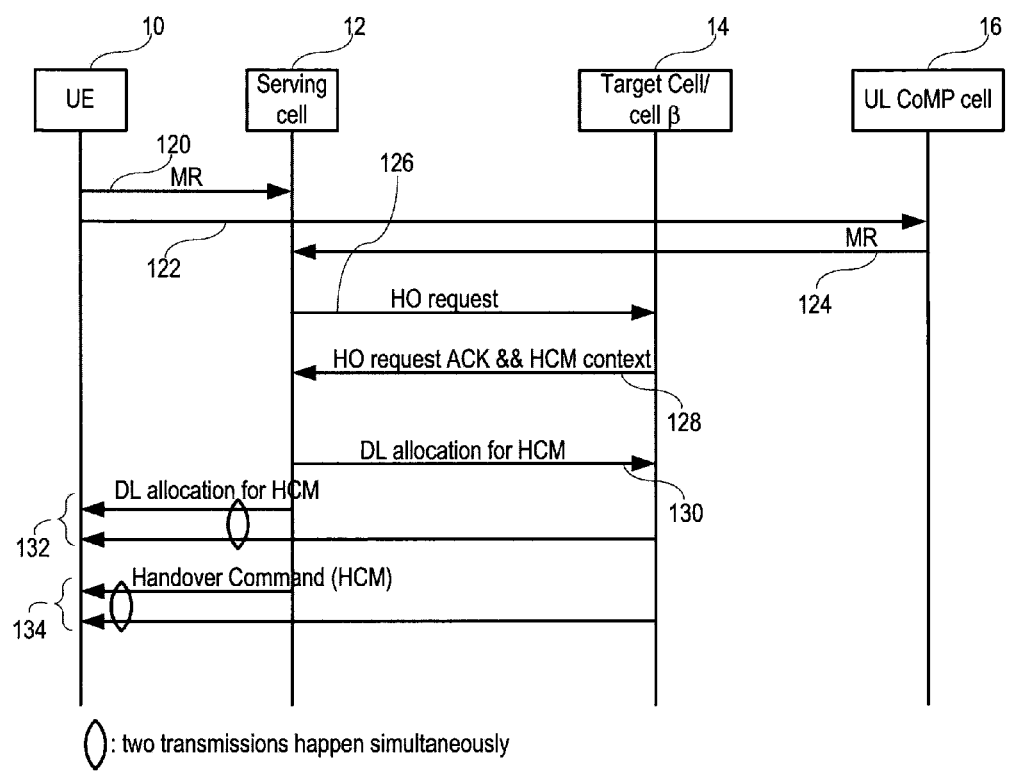
FIG. 3 illustrates example message flow for implementing cell handover when the target cell for the UE is the strongest downlink (DL) CoMP cell (i.e., cell β)
Figure 4:
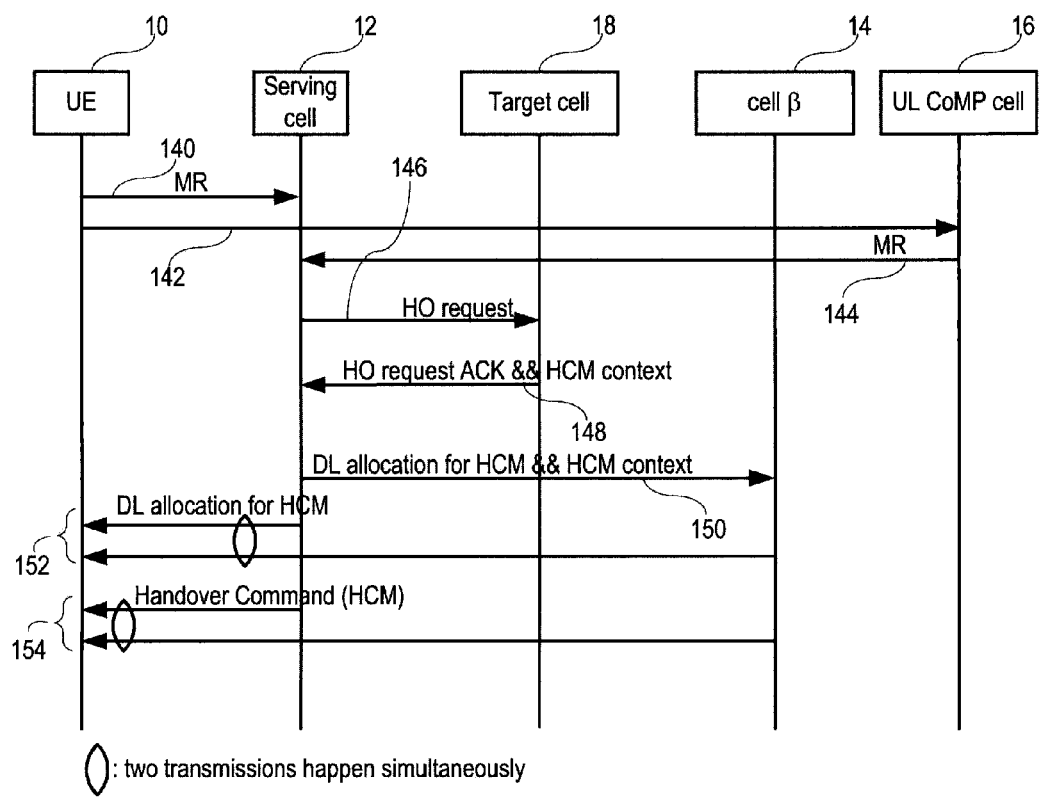
FIG. 4 illustrates example message flow for implementing cell handover when the target cell is not cell β.

FIGS. 3 and 4 illustrate example message flow for implementing cell handover in accordance with the present implementation. FIG. 3 illustrates example message flow for implementing cell handover when the target cell for the UE is the strongest DL CoMP cell (i.e., cell β). In step 120, UE 10 transmits a measurement report to serving cell 12 and, in step 122, UE 10 transmits the measurement report to UL CoMP cells 16. Throughout the present disclosure, the transmission of measurement reports to the serving cell and the UL CoMP cells may occur simultaneously or separately. UL CoMP cells 16 may then forward the measurement report to serving cell 12 in step 124. After receiving the measurement report(s) and determining an appropriate target cell, serving cell 12 transmits a handover (HO) request to the target cell 14 (in this example, target cell 14 is also the strongest DL CoMP cell as specified in the measurement report) in step 126. Target cell 14 responds to the HO request with an HO request ACK and HCM context in step 128. After receiving the HO acknowledgement, serving cell 12 initiates DL allocation for HCM and sends the HCM allocation (alternatively, HO command allocation) to target cell 14 in step 130. At this point, UE 10 is listening to both target cell 14 and serving cell 12 for handover instructions.

In step 132, both serving cell 12 and target cell 14 attempt to transmit a DL allocation for HCM message to UE 10. Because UE 10 is listening to both serving cell 12 and target cell 14, UE 10 may receive the transmission from either source or from both. In step 134, both serving cell 12 and target cell 14 attempt to simultaneously transmit an HCM message to UE 10 causing UE 10 to handover to target cell 14. The HCM transmission is on PDSCH using CoMP mode so the UE receives the HCM message jointly from serving cell 12 and target cell 14. As a result, the present system is robust—even if the radio link with serving cell 12 has failed entirely, UE 10 may still be able to receive the handover instructions and execute a successful handover to target cell 14.

In many cases, the target cell is the same as cell β. However, in some cases, cell β may not have enough resources to accommodate the handover call due to load balancing. In that case, the handover call may be diverted to other cells that may have worse channel quality, but more available resources. FIG. 4 illustrates example message flow for implementing cell handover when the target cell is not the same as cell β. With reference to FIG. 4, in step 140, UE 10 transmits a measurement report to serving cell 12 and in step 142 UE 10 transmits a measurement report to UL CoMP cells 16. Steps 140 and 142 may occur simultaneously, or, alternatively, only one of steps 140 and 142 may be executed. UL CoMP cells 16 may then forward the measurement report to serving cell 12 in step 144.

After receiving the measurement report and determining an appropriate target cell 18, serving cell 12 transmits an HO request to the target cell 18 (in this example, target cell 18 is not the strongest DL CoMP cell as specified in the measurement report—it may, for example, include a cell that has the necessary resources to service UE 10's request) in step 146. Target cell 18 responds to the HO request with an HO request ACK and HCM context in step 148. After receiving the HO acknowledgement, serving cell 12 provides a DL allocation for HCM as well as HCM context on target cell 14 to cell β 14 in step 150. At this point, UE 10 is listening to both cell β 14 and serving cell 12 for handover instructions.

In step 152, both serving cell 12 and cell β 14 attempt to transmit a DL allocation for HCM message to UE 10 that identifies target cell 18. Because UE 10 is listening to both serving cell 12 and cell β 14, UE 10 may receive the transmission from either source or from both. In step 154, both serving cell 12 and cell β 14 attempt to transmit an HCM message to UE 10 causing UE 10 to associate with target cell 18. The HCM transmission is on PDSCH using CoMP mode so the UE may receive the HCM message jointly from serving cell 12 and cell β 14. Even if the radio link with serving cell 12 has failed, UE 10 may still be able to receive the handover instructions from cell β 14 and execute a successful handover to target cell 18.

It should be noted that in this example, even though the UE may receive the HCM DL assignment from two cells, it is possible that the UE only receives the HCM DL assignment from a single cell, for example, the serving cell, via higher CCE aggregation level such as 16 or 32 as described above. The UE may also only receive the HCM DL assignment from the cell β.

In a second implementation of the present system, when a UE detects a radio link problem with a serving cell after transmitting a measurement report, but before receiving an HCM, the UE is configured to start a T1 timer in accordance with existing specifications. A radio link problem may be defined as the receipt of N310 consecutive out-of-sync indications from lower layers, for example. In existing systems, upon detecting a radio link problem, the UE stays with the current serving cell and attempts to recover from the radio link problem before T1 expires. In the present system, however, rather than stay with the serving cell, the UE begins to listen to the strongest CoMP cell for HCM DL assignment (i.e., cell β) as well as an HCM itself upon starting the T1 timer. Cell β is then instructed to send the HCM to the UE on behalf of the serving cell. Accordingly, cell β acts as a proxy to facilitate handover from the serving cell. If the UE receives the HO command before T1 expires, the UE stops the T1 timer and executes the handover procedure by accessing the new target cell as identified within the HO command. If the UE fails to receive the HO Command before T1 expires, however, the UE may start a T2 timer and initiate the second phase of radio link recovery, i.e., UE-based mobility radio link recovery processes as indicated by element 110 of FIG. 2 and in accordance with existing specifications.

The present system may also be configured to compensate for temporary radio link failure between the UE and the serving cell (e.g., the UE enters a tunnel but may still be able to come back to the original serving cell after leaving the tunnel). In that case, when a UE detects a radio link problem, the UE may be configured to start a timer T_c upon detecting the RLF. After starting T_c, the UE listens to the strongest CoMP cell for HCM DL assignment as well as the HCM itself. If the UE receives the HO command before T_c expires, the UE stops T_c and executes handover to access the new target cell as indicated in the HO command. If, however, the UE fails to receive the HO Command before T_c expires, the UE is configured to return to the original serving cell and start the T1 timer to again attempt to recover the radio link with the serving cell. If the UE can recover the radio link with the serving cell before T1 expires, the UE returns to the original serving cell. If not, the UE starts timer T2 and enters the second phase of the radio link recovery process. This approach provides the UE with an opportunity to return to the serving cell to recover from a sudden temporary radio link quality change in some scenarios.

The present system allows for proxy handover control that is facilitated by cell β and allows for handover to be performed to a target cell defined by the serving cell. In existing Rel.8 UE-based mobility aiming to recover from RLF, the UE autonomously accesses a new cell based upon the UE's own decision and evaluation of the UE's measurement report. In Rel.8, if the cell selected by the UE happens to have the context of the UE, the UE may keep RRC_connected and continue the handover. If, however, the new cell does not have the UE context, the UE will go to RRC_IDLE mode and start with a new cell reselection procedure.

In contrast, in the present system the cell to which the UE listens for handover instructions may or may not be the cell to which the UE handovers. The cell the UE will listen to after the UE detects a radio link problem, however, is generally the best cell as indicated in the measurement report (i.e. cell β). Because LTE handover is a network-controlled mobility, the serving cell can decide to which cell the UE will handover, rather than the UE. In some cases, however, the best cell may not have enough capacity to accept the handover calls. If that is the case, the serving cell may be configured to select a target cell other than the cell with the strongest radio link to the UE. After the serving cell receives the measurement report and determines handover is necessary, the serving cell follows existing handover procedures until the serving cell receives the HO Request ACK and HCM context from the target cell. If the target cell is cell β, the serving cell may send an HO Proxy message containing the exclusive C-RNTI ID, to cell β. If, however, the new target cell is not cell β, the serving cell sends an HO Proxy message containing the full context of the HCM, to cell β.

After cell β receives the HO Proxy message from the serving cell, cell β starts a timer T_a. Timer T_a defines a period of time during which cell β waits before broadcasting the HO Proxy message (during this time the UE listens for instructions from the serving cell). If T_a expires before cell β receives an HO Proxy Stop message from the serving cell, cell β starts a second timer T_b and acts as the proxy-serving base station to control the handover procedure for the UE to initiate the handover for the duration of timer T_b. During timer T_b, the serving cell turns handover control completely to the proxy cell (i.e., cell β) and cell β broadcasts the HO command to the UE. As a result, at any time the UE only has to listen to one cell at any time, thereby minimizing the performance requirements for the UE. When operating as the proxy cell (i.e., during timer T_b), cell β sends the DL assignment of HCM to the UE using cell β's own cell ID and the exclusive C-RNTI for the UE, followed by the HCM to the UE. When timer Tb expires or when cell β receives the HO Command ACK or when cell β receives the HO Proxy Stop message, cell β may stop sending the HO command to the UE and clear handover related context related to that UE. In some cases, it is possible that before timer T_b expires or before cell β receives the HO Command ACK or before cell β receives the HO Proxy Stop message, cell β may be configured to send HO command multiple times to enhance the chance of reception.

Figure 6:
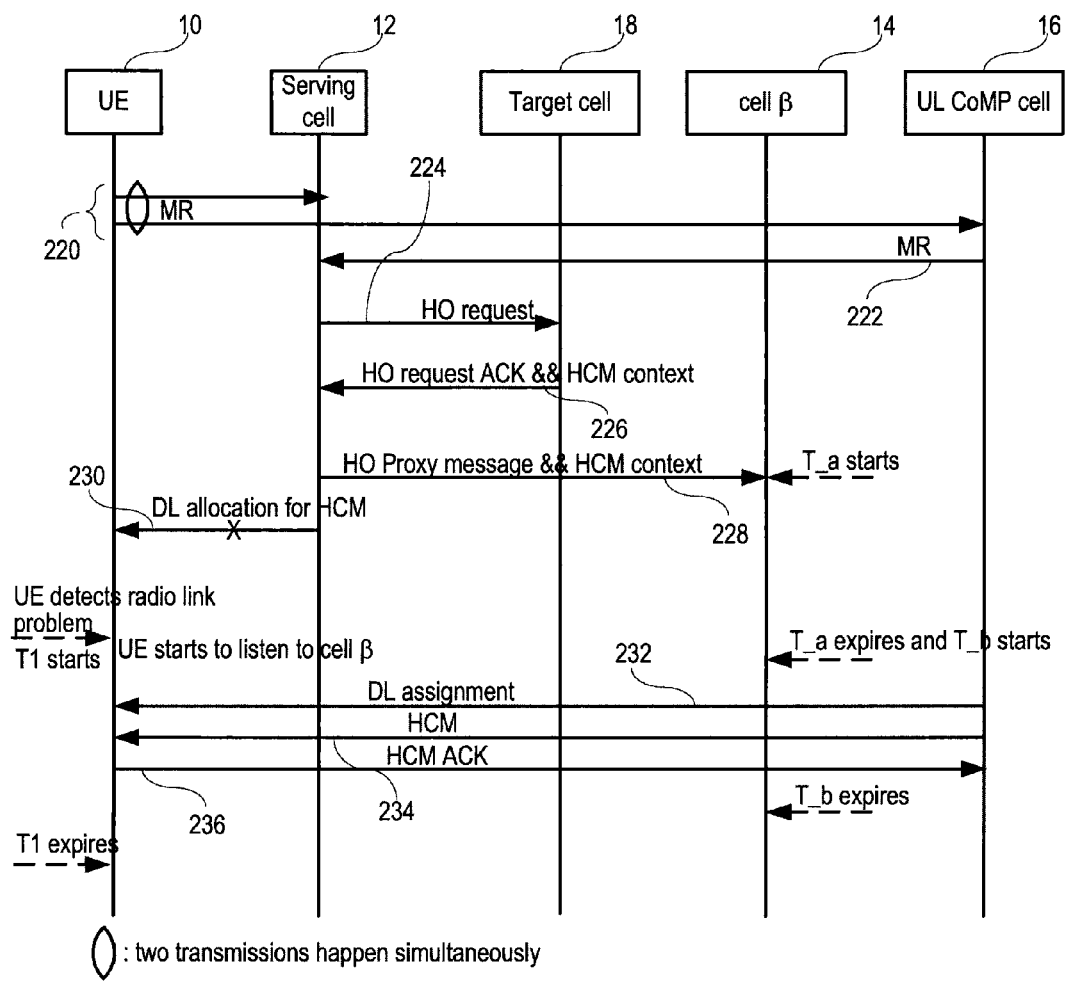
FIG. 6 illustrates example message flow for implementing cell handover where timer T_a expires.
Figure 7:
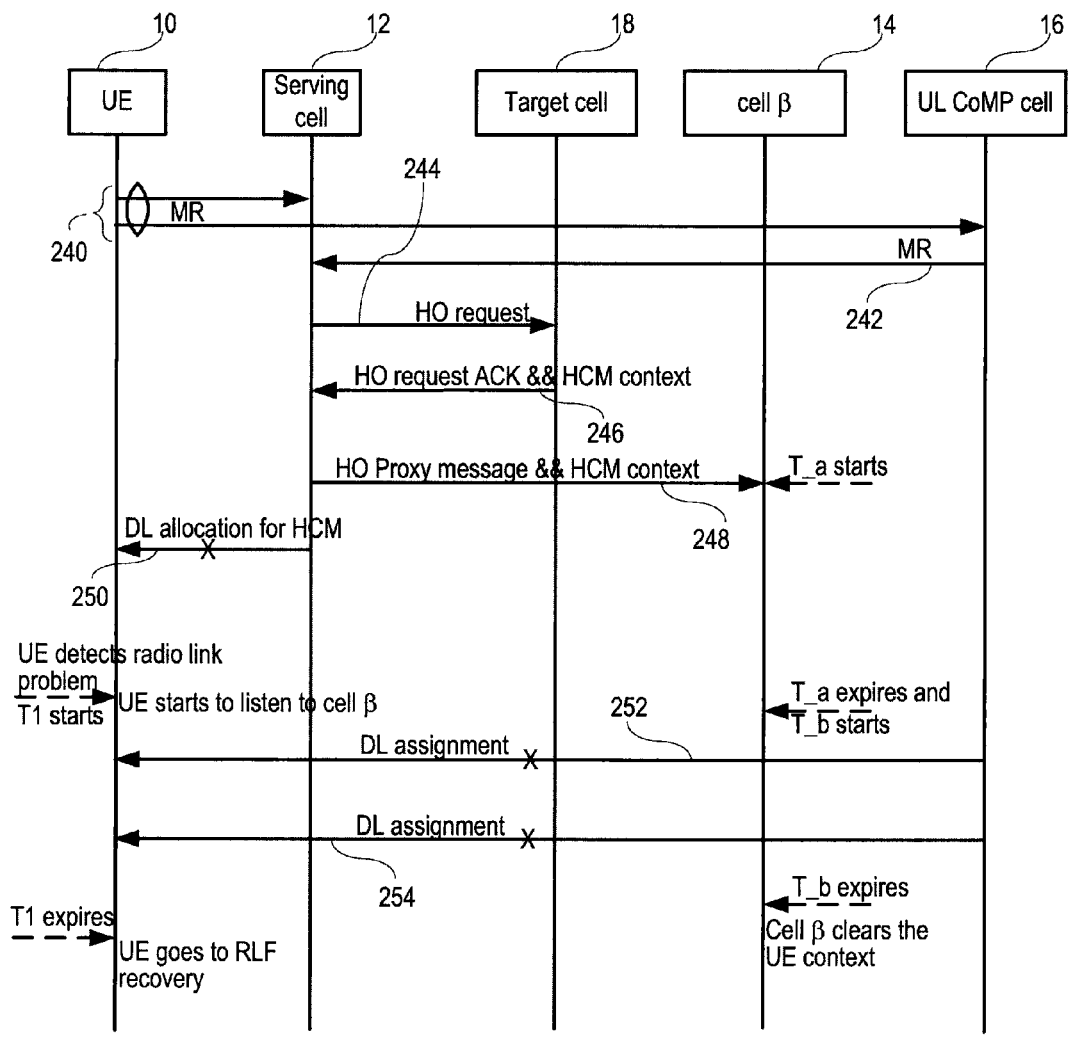
FIG. 7 illustrates example message flow for implementing cell handover where each of timers T_a, T_b, and T1 expires.
Figure 8:
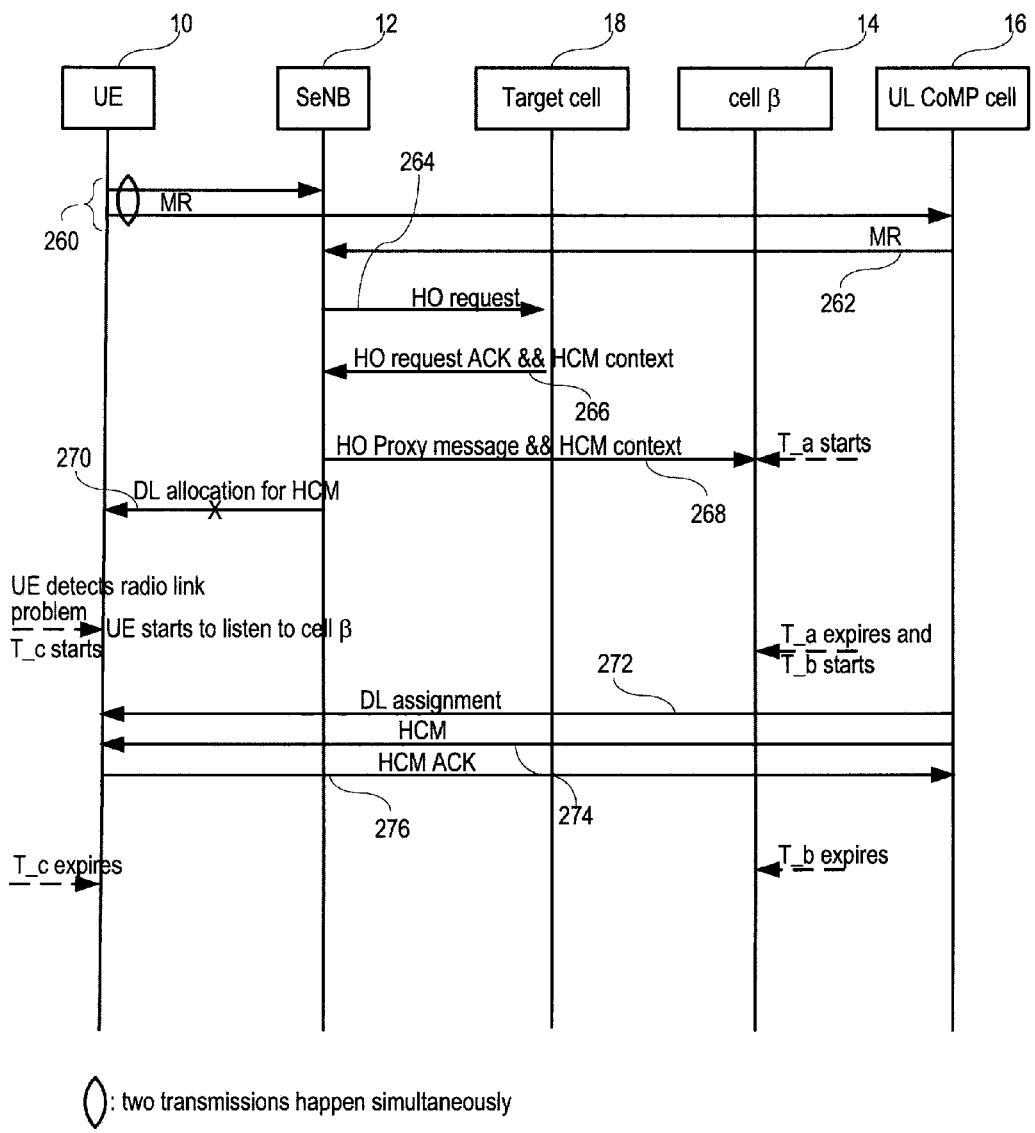
FIG. 8 illustrates example message flow for implementing cell handover where timer T_a expires and the UE is configured to implement a second timer for attempting to connect to the original serving cell.
Figure 9:
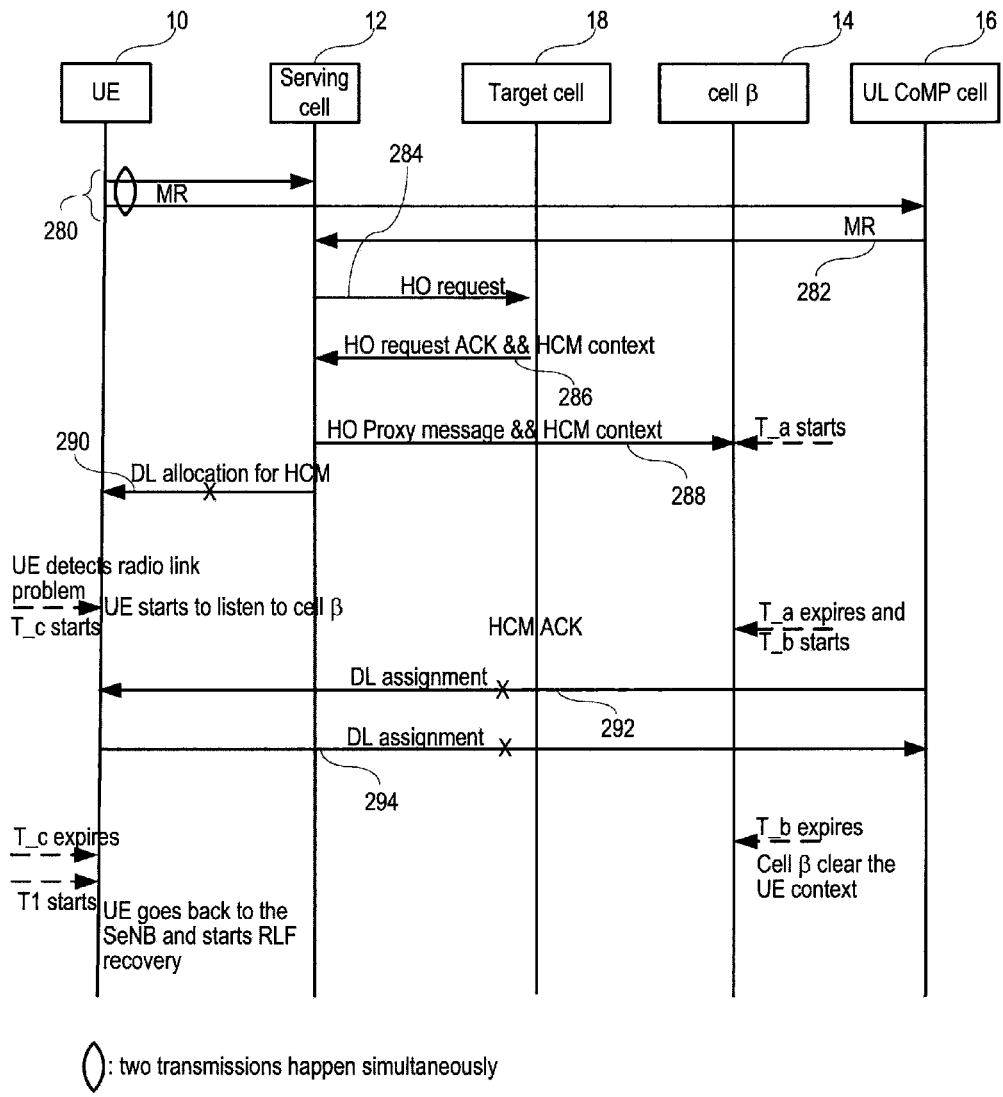
FIG. 9 illustrates example message flow for implementing cell handover where timers T_a, T_b, and T_c each expire.

FIGS. 5-9 illustrate example message flows for implementing cell handover in accordance with the present implementation. FIGS. 8-9 illustrate second example message flows for implementing cell handover using the timer T_c described above.

Figure 5:
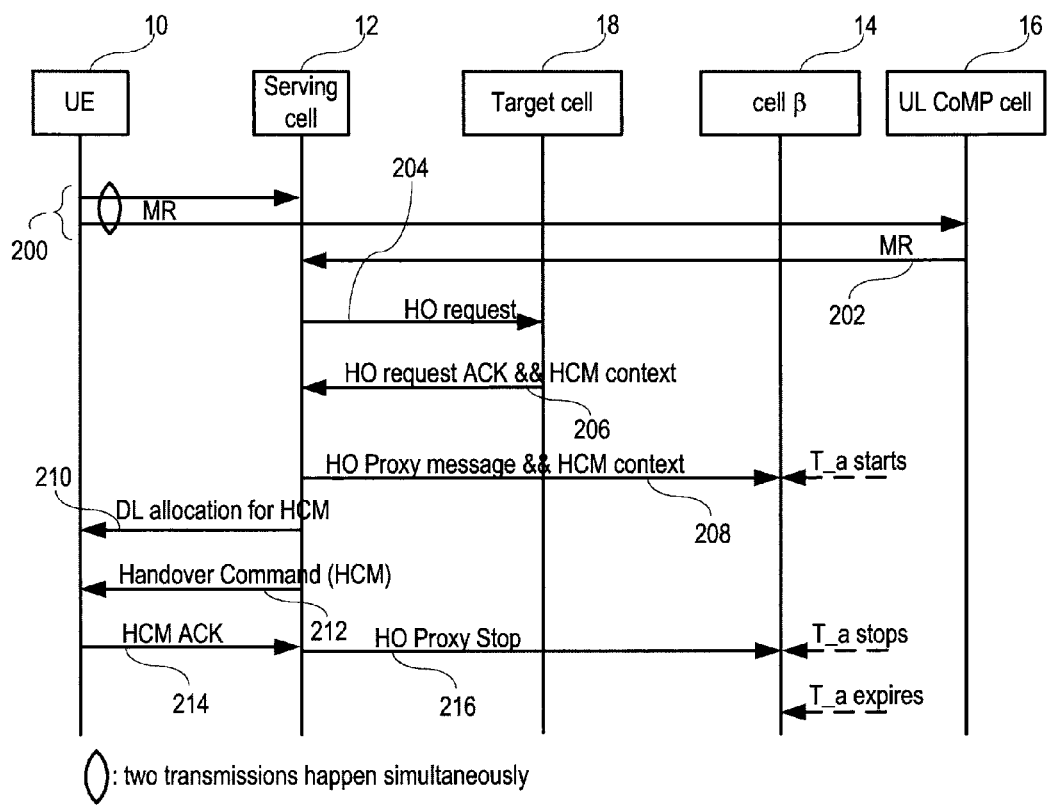
FIG. 5 illustrates example message flow for implementing cell handover where no timers expire.

FIG. 5 illustrates example message flow for implementing cell handover where no timers expire. Because there is no timer expiration, the UE receives the HO Command from the serving cell and does not begin listening to cell β.

Referring to FIG. 5, in step 200, UE 10 transmits a measurement report to serving cell 12 and UL CoMP cells 16. UL CoMP cells 16 then forward the measurement report to serving cell 12 in step 202. After receiving the measurement report and determining an appropriate target cell 18, serving cell 12 transmits an HO request to the target cell 18 (in this example, target cell 18 is not the strongest DL CoMP cell as specified in the measurement report—it may, for example, include a cell that has the necessary resources to service UE 10's request) in step 204. Target cell 18 responds to the HO request with an HO request ACK and HCM context in step 206. After receiving the HO ACK, serving cell 12 transmits an HO proxy message and HCM context on target cell 18 to cell β 14 in step 208. At this point, cell β 14 starts timer T_a. When timer T_a expires, cell β 14 will start timer T_b and begin to operate as the proxy-serving base station to control the handover procedure for the UE for the duration of timer T_b.

In step 210, however, serving cell 12 successfully transmits a DL allocation for HCM message to UE 10 that identifies target cell 18 and in step 212, serving cell 12 transmits an HCM message to UE 10 causing UE 10 to perform handover to target cell 18. In step 214, UE 10 responds to the HCM message with an HCM ACK to serving cell 12. In step 216, after receiving the HCM ACK, serving cell 12 transmits an HO Proxy Stop message to Cell β 14. After receiving the HO Proxy Stop message, cell β 14 may clear all stored contexts associated with UE 10 and does not function as a proxy base station for serving cell 12.

FIG. 6 illustrates example message flow for implementing cell handover where timer T_a expires. When the UE first detects a radio link problem, the UE starts the T1 timer and switches to listen to cell β. T_a starts when cell β receives the HO proxy message and T_a will expire unless cell β does not receive an HO Proxy Stop message. When T_a expires, cell β starts timer T_b and begins to act as a proxy-serving base station and transmits the HCM to the UE for the duration of timer T_b. Accordingly, T_a defines a period of time during which the serving cell attempts to transmit the HCM message to the UE.

Referring to FIG. 6, in step 220, UE 10 transmits a measurement report to serving cell 12 and UL CoMP cells 16. UL CoMP cells 16 then forward the measurement report to serving cell 12 in step 222. After receiving the measurement report and determining an appropriate target cell 18, serving cell 12 transmits an HO request to the target cell 18 (in this example, target cell 18 is not the strongest DL CoMP cell as specified in the measurement report—it may, for example, include a cell that has the necessary resources to service UE 10's request) in step 224. Target cell 18 responds to the HO request with an HO request ACK and HCM context in step 226. After receiving the HO acknowledgement, serving cell 12 transmits an HO proxy message and HCM context on target cell 18 to cell β 14 in step 228. If the target cell 18 is the same as cell β 14, serving cell 12 only needs to transmit an HO proxy message to cell β 14 in step 228 At this point, cell β 14 starts timer T_a. When T_a expires, cell β 14 will start timer T_b and begin to operate as the proxy-serving base station to control the handover procedure for the UE for the duration of timer T_b.

In step 230, a DL allocation for HCM is not successfully transmitted to UE 10 from serving cell 12. Accordingly, UE 10 detects a radio link failure with serving cell 12, starts the T1 timer, and begins listening to cell β 14. After timer T_a expires, cell β 14 starts timer T_b and begins to operate as a proxy-serving base station to transmit the HCM to the UE. Accordingly, in step 232, cell β 14 transmits a DL assignment to UE 10 that identifies the HCM resource allocation. In step 234, cell β 14 transmits an HCM message to UE 10 causing UE 10 to perform handover to the target cell (in some cases, the target cell may be the same as cell β). In step 236, UE 10 responds to the HCM message with an HCM ACK to cell β 14.

FIG. 7 illustrates example message flow for implementing cell handover where each of timers T_a, T_b, and T1 expires. When the radio link problem is detected, the UE starts the timer T1 and switches to listen to cell β. T1 expires if the UE does not receive the HCM from cell β within the time period defined by T1. After T1 expires, the UE may start the T2 timer and enter the second phase of radio link recovery process. In this example, T_a expires unless cell β receives an HO Proxy Stop message. When T_a expires, cell β may start T_b timer and act as proxy-serving base station and send an HCM to the UE. T_b expires unless cell β receives an HO Stop Proxy message from the serving cell or an HO Command ACK message from the UE. After T_b expires, cell β stops sending HCM to the UE and clears all UE-related contexts and ceases acting as a proxy-serving base station for serving cell 12.

With reference to FIG. 7, in step 240, UE 10 transmits a measurement report to serving cell 12 and UL CoMP cells 16. UL CoMP cells 16 then forward the measurement report to serving cell 12 in step 242. After receiving the measurement reports and determining an appropriate target cell 18, serving cell 12 transmits an HO request to the target cell 18 (in this example, target cell 18 is not the strongest DL CoMP cell as specified in the measurement report—it may, for example, include a cell that has the necessary resources to service UE 10's request) in step 244. Target cell 18 responds to the HO request with an HO request ACK and HCM context in step 246. After receiving the HO request acknowledgement, serving cell 12 transmits an HO proxy message and HCM context on target cell 18 to cell β 14 in step 248. If the target cell 18 is the same as cell β 14, serving cell 12 only needs to transmit an HO proxy message to cell β 14 in step 248. At this point, cell β 14 starts timer T_a. When T_a expires, cell β 14 will start timer T__b and begin to operate as the proxy-serving base station to control the handover procedure for the UE for the duration of timer T_b.

In step 250, UE 10 detects a radio link failure with serving cell 12 as the DL allocation for HCM transmission fails. Upon detecting the radio link failure, UE 10 starts the T1 timer and begins listening to cell β 14. After timer T_a expires, cell β 14 begins to operate as a proxy-serving base station to transmit the HCM to the UE. Accordingly, in step 252 cell β 14 attempts to transmit a DL assignment to UE 10 that identifies the target cell, but the transmission fails. In step 254, cell β 14 again attempts to transmit a DL assignment to UE 10 that identifies the target cell, but the transmission also fails (in some cases, the target cell may be the same cell as cell β 14). After step 254, timer T_b expires and cell β 14 ceases operation as a proxy for serving cell 12 and clears all UE 10 contexts. Eventually, timer T1 on UE 10 expires. After the expiration of timer T1, UE 10 may start timer T2 and enter the second phase of the radio link recovery process.

Regarding the implementations illustrated in FIGS. 5-7, the values of the different timers (e.g., T_a, T_b, and T1) may play a significant role in the operation of the system. T_a may be selected to have a value approximately equal to the time for n*(round trip air interface delay) plus the X2 delay, with the variable n representing the HARQ retransmission times for the HCM message. In some cases, T_b may have a value of at least n*round trip air interface delay, however T_b may have a value significant larger.

FIG. 8 illustrates example message flow for implementing cell handover where UE is configured to implement timer T_c. When a radio link problem is detected, the UE starts the timer T_c and switches to listen to cell β. T_a starts when cell β receives the HO proxy message and T_a expires unless cell β receives an HO Proxy Stop message. When T_a expires, cell β starts timer T_b and begins to act as proxy-serving base station and sends the HCM to the UE.

With reference to FIG. 8, in step 260, UE 10 transmits a measurement report to serving cell 12 and UL CoMP cells 16. UL CoMP cells 16 may then forward the measurement report to serving cell 12 in step 262. After receiving the measurement report and determining an appropriate target cell 18, serving cell 12 transmits an HO request to the target cell 18 (in this example, target cell 18 is not the strongest DL CoMP cell as specified in the measurement report—it may, for example, include a cell that has the necessary resources to service UE 10's request) in step 264. Target cell 18 responds to the HO request with an HO request ACK and HCM context in step 266. After receiving the HO acknowledgement, serving cell 12 transmits an HO proxy message and HCM context on target cell 18 to cell β 14 in step 268. If the target cell 18 is the same as cell β 14, serving cell 12 only needs to transmit an HO proxy message to cell β 14 in step 268. At this point, cell β 14 starts timer T_a. When T_a expires, cell β 14 will start timer T__b and begin to operate as the proxy-serving base station to control the handover procedure for the UE for the duration of timer T_b.

In step 270, UE 10 detects a radio link failure with serving cell 12 as the DL allocation for HCM transmission fails. Upon detecting the radio link failure, UE 10 starts the T_c timer and begins listening to cell β 14. After timer T_a expires, cell β 14 begins to operate as a proxy-serving base station to transmit the HCM to the UE. In step 272, cell β 14 transmits a DL assignment to UE 10 that identifies the PDSCH resources for HCM message transmission. In step 274, cell β 14 transmits an HCM message to UE 10 causing UE 10 to perform handover to the target cell. In step 276, UE 10 responds to the HCM message with an HCM ACK to cell β 14.

FIG. 9 illustrates example message flow for implementing cell handover where timers T_a, T_b, and T_c each expire. When the radio link problem is detected, the UE starts timer T_c and switches to listen to cell β. Timer T_c expires unless the UE receives the HCM from cell β. After timer T_c expires, the UE will start timer T1 and enter the first phase of the radio link recovery process listening on the serving cell. T_a expires unless cell β receives an HO Proxy Stop message. When T_a expires, cell β will start to act as a proxy-serving base station and send an HCM to the UE. T_b expires unless cell β receives an HO Stop Proxy message from the serving cell or an HO Command ACK message from the UE. After T_b expires, cell β stops sending HCM messages to the UE and clears all UE-related contexts.

With reference to FIG. 9, in step 280, UE 10 transmits a measurement report to serving cell 12 and UL CoMP cells 16. UL CoMP cells 16 may then forward the measurement report to serving cell 12 in step 282. After receiving the measurement report and determining an appropriate target cell 18, serving cell 12 transmits an HO request to the target cell 18 (in this example, target cell 18 is not the strongest DL CoMP cell as specified in the measurement report—it may, for example, include a cell that has the necessary resources to service UE 10's request) in step 284. Target cell 18 responds to the HO request with an HO request ACK and HCM context in step 286. After receiving the HO acknowledgement, serving cell 12 transmits an HO proxy message and HCM context on target cell 18 to cell β 14 in step 288. If the target cell 18 is the same as cell β 14, serving cell 12 only needs to transmit an HO proxy message to cell β 14 in step 288. At this point, cell β 14 starts timer T_a. When T_a expires, cell β 14 will start timer T_b and begin to operate as the proxy-serving base station to control the handover procedure for the UE for the duration of timer T_b.

In step 290, UE 10 detects an RLF with serving cell 12 as the DL allocation for HCM transmission fails. Upon detecting the RLF, UE 10 starts the T_c timer and starts to listen to cell β 14. After timer T_a expires, cell β 14 begins to operate as a proxy-serving base station to transmit the HCM to the UE. Accordingly, in step 292 cell β 14 attempts to transmit a DL assignment to UE 10 that identifies the target cell, but the transmission fails. In step 294, cell β 14 again attempts to transmit a DL assignment to UE 10 that identifies the target cell, but the transmission also fails. After step 294, timer T_b expires and cell β 14 ceases operation as a proxy for serving cell 12 and clears all UE 10 contexts. Eventually, timer T_c on UE 10 expires. After the expiration of timer T_c, UE 10 may start timer T1 and initiate an RLF recovery process with serving cell 12. If UE 10 is unable to perform RLF recovery with serving cell 12 before the expiration of timer T1, UE 10 starts timer T2 and enters the second phase of RLF process in accordance with existing specifications.

In the system implementations illustrated in FIGS. 8 and 9, the values of the various timers may influence system operation. When the UE implements the timer T_c, for example, timer T_a may be selected to have a value that is approximately equal to the time for n*(round trip air interface delay) plus the X2 delay, with the variable n representing the HARQ retransmission times for the HCM message. T_b should be selected at least as n*round trip air interface delay, but may have a larger value. Generally, the values of the timers T_c and T_b are approximately equal.

In circumstances where the UE receives the HCM from the serving cell while the serving cell fails to receive the HCM ACK from the UE, the UE may start to access the target cell while at the same time cell β may start to act as the proxy base station. This situation may occur if the UE has an UUDL imbalance, that is, the UE has a good DL quality but a poor UL quality. In that case, if cell β is the new target cell, after cell β receives the first message from the UE, cell β is configured to stop the proxy control and all related timers. Alternatively, if cell β is different from the new target cell, cell β may continue to provide proxy control until T_b expires. In this case, however, additional bandwidth may be wasted at cell β if cell β continues to operate as a proxy even after the UE has already issued an HCM ACK and executed the handover process to the new target cell.

Figure 10:
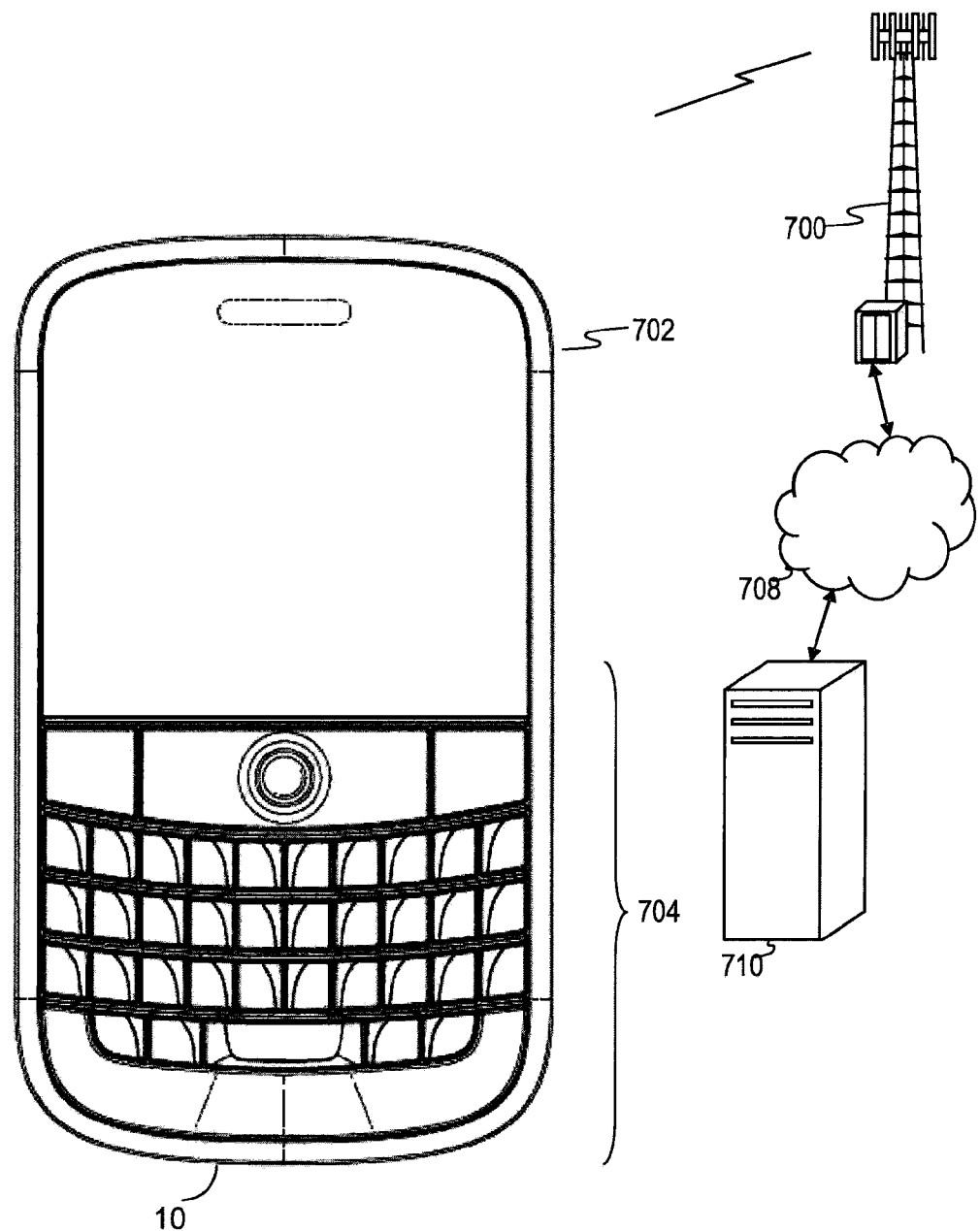
FIG. 10 is a diagram of a wireless communications system including a UE operable for some of the various embodiments of the disclosure.

FIG. 10 illustrates a wireless communications system including an embodiment of UE 10. UE 10 is operable for implementing aspects of the disclosure, but the disclosure should not be limited to these implementations. Though illustrated as a mobile phone, the UE 10 may take various forms including a wireless handset, a pager, a personal digital assistant (PDA), a portable computer, a tablet computer, a laptop computer. Many suitable devices combine some or all of these functions. In some embodiments of the disclosure, the UE 10 is not a general purpose computing device like a portable, laptop or tablet computer, but rather is a special-purpose communications device such as a mobile phone, a wireless handset, a pager, a PDA, or a telecommunications device installed in a vehicle. The UE 10 may also be a device, include a device, or be included in a device that has similar capabilities but that is not transportable, such as a desktop computer, a set-top box, or a network node. The UE 10 may support specialized activities such as gaming, inventory control, job control, and/or task management functions, and so on.

The UE 10 includes a display 702. The UE 10 also includes a touch-sensitive surface, a keyboard or other input keys generally referred as 704 for input by a user. The keyboard may be a full or reduced alphanumeric keyboard such as QWERTY, Dvorak, AZERTY, and sequential types, or a traditional numeric keypad with alphabet letters associated with a telephone keypad. The input keys may include a trackwheel, an exit or escape key, a trackball, and other navigational or functional keys, which may be inwardly depressed to provide further input function. The UE 10 may present options for the user to select, controls for the user to actuate, and/or cursors or other indicators for the user to direct.

The UE 10 may further accept data entry from the user, including numbers to dial or various parameter values for configuring the operation of the UE 10. The UE 10 may further execute one or more software or firmware applications in response to user commands. These applications may configure the UE 10 to perform various customized functions in response to user interaction. Additionally, the UE 10 may be programmed and/or configured over-the-air, for example from a wireless base station, a wireless access point, or a peer UE 10.

Among the various applications executable by the UE 10 are a web browser, which enables the display 702 to show a web page. The web page may be obtained via wireless communications with a wireless network access node, a cell tower, a peer UE 10, or any other wireless communication network or system 700. The network 700 is coupled to a wired network 708, such as the Internet. Via the wireless link and the wired network, the UE 10 has access to information on various servers, such as a server 710. The server 710 may provide content that may be shown on the display 702. Alternately, the UE 10 may access the network 700 through a peer UE 10 acting as an intermediary, in a relay type or hop type of connection.

Figure 11:
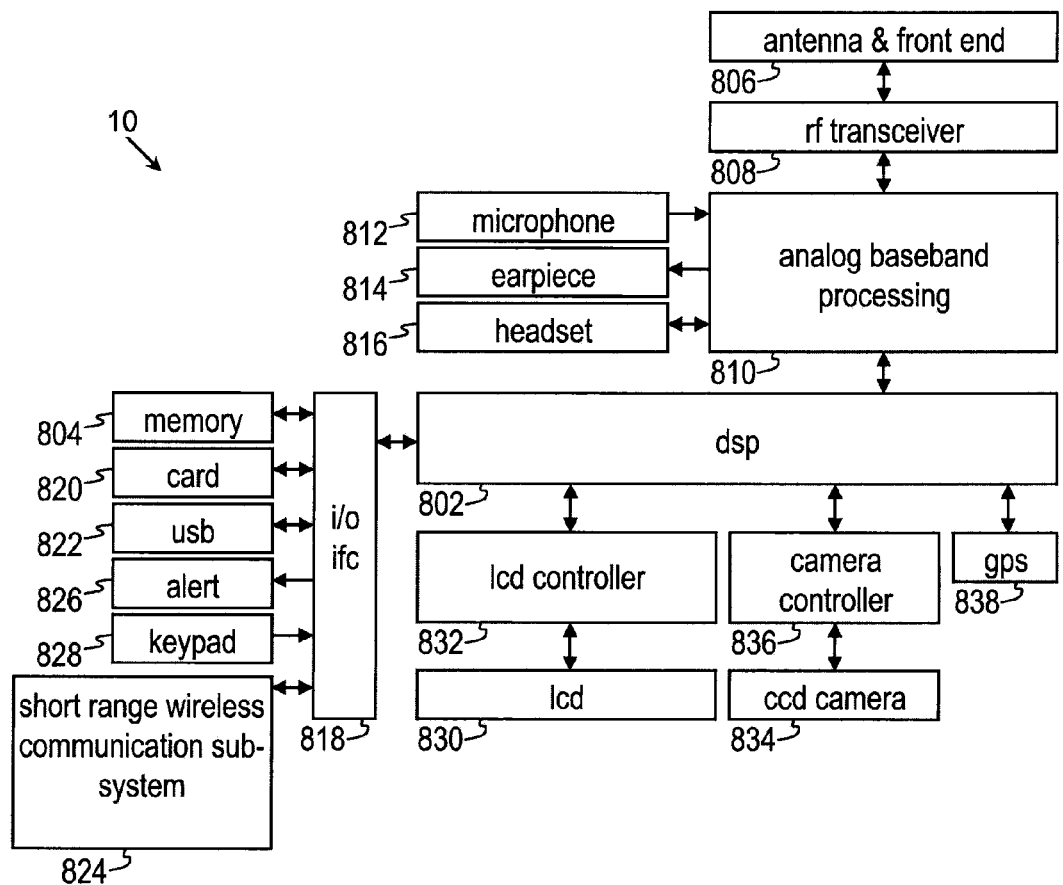
FIG. 11 is a block diagram of a UE operable for some of the various embodiments of the disclosure.

FIG. 11 shows a block diagram of the UE 10. While a variety of known components of UAs 110 are depicted, in an embodiment a subset of the listed components and/or additional components not listed may be included in the UE 10. The UE 10 includes a digital signal processor (DSP) 802 and a memory 804. As shown, the UE 10 may further include an antenna and front end unit 806, a radio frequency (RF) transceiver 808, an analog baseband processing unit 810, a microphone 812, an earpiece speaker 814, a headset port 816, an input/output interface 818, a removable memory card 820, a universal serial bus (USB) port 822, a short range wireless communication sub-system 824, an alert 826, a keypad 828, a liquid crystal display (LCD), which may include a touch sensitive surface 830, an LCD controller 832, a charge-coupled device (CCD) camera 834, a camera controller 836, and a global positioning system (GPS) sensor 838. In an embodiment, the UE 10 may include another kind of display that does not provide a touch sensitive screen. In an embodiment, the DSP 802 may communicate directly with the memory 804 without passing through the input/output interface 818.

The DSP 802 or some other form of controller or central processing unit operates to control the various components of the UE 10 in accordance with embedded software or firmware stored in memory 804 or stored in memory contained within the DSP 802 itself. In addition to the embedded software or firmware, the DSP 802 may execute other applications stored in the memory 804 or made available via information carrier media such as portable data storage media like the removable memory card 820 or via wired or wireless network communications. The application software may comprise a compiled set of machine-readable instructions that configure the DSP 802 to provide the desired functionality, or the application software may be high-level software instructions to be processed by an interpreter or compiler to indirectly configure the DSP 802.

The antenna and front end unit 806 may be provided to convert between wireless signals and electrical signals, enabling the UE 10 to send and receive information from a cellular network or some other available wireless communications network or from a peer UE 10. In an embodiment, the antenna and front end unit 806 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 806 may include antenna tuning and/or impedance matching components, RF power amplifiers, and/or low noise amplifiers.

The RF transceiver 808 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 810 and/or the DSP 802 or other central processing unit. In some embodiments, the RF Transceiver 808, portions of the Antenna and Front End 806, and the analog base band processing unit 810 may be combined in one or more processing units and/or application specific integrated circuits (ASICs).

The analog baseband processing unit 810 may provide various analog processing of inputs and outputs, for example analog processing of inputs from the microphone 812 and the headset 816 and outputs to the earpiece 814 and the headset 816. To that end, the analog baseband processing unit 810 may have ports for connecting to the built-in microphone 812 and the earpiece speaker 814 that enable the UE 10 to be used as a cell phone. The analog baseband processing unit 810 may further include a port for connecting to a headset or other hands-free microphone and speaker configuration. The analog baseband processing unit 810 may provide digital-to-analog conversion in one signal direction and analog-to-digital conversion in the opposing signal direction. In some embodiments, at least some of the functionality of the analog baseband processing unit 810 may be provided by digital processing components, for example by the DSP 802 or by other central processing units.

The DSP 802 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 802 may perform modulation, coding, interleaving, and spreading, and for a receiver function the DSP 802 may perform despreading, deinterleaving, decoding, and demodulation. In another embodiment, for example in an orthogonal frequency division multiplex access (OFDMA) technology application, for the transmitter function the DSP 802 may perform modulation, coding, interleaving, inverse fast Fourier transforming, and cyclic prefix appending, and for a receiver function the DSP 802 may perform cyclic prefix removal, fast Fourier transforming, deinterleaving, decoding, and demodulation. In other wireless technology applications, yet other signal processing functions and combinations of signal processing functions may be performed by the DSP 802.

The DSP 802 may communicate with a wireless network via the analog baseband processing unit 810. In some embodiments, the communication may provide Internet connectivity, enabling a user to gain access to content on the Internet and to send and receive e-mail or text messages. The input/output interface 818 interconnects the DSP 802 and various memories and interfaces. The memory 804 and the removable memory card 820 may provide software and data to configure the operation of the DSP 802. Among the interfaces may be the USB interface 822 and the short range wireless communication sub-system 824. The USB interface 822 may be used to charge the UE 10 and may also enable the UE 10 to function as a peripheral device to exchange information with a personal computer or other computer system. The short range wireless communication sub-system 824 may include an infrared port, a Bluetooth interface, an IEEE 802.11 compliant wireless interface, or any other short range wireless communication sub-system, which may enable the UE 10 to communicate wirelessly with other nearby mobile devices and/or wireless base stations.

The input/output interface 818 may further connect the DSP 802 to the alert 826 that, when triggered, causes the UE 10 to provide a notice to the user, for example, by ringing, playing a melody, or vibrating. The alert 826 may serve as a mechanism for alerting the user to any of various events such as an incoming call, a new text message, and an appointment reminder by silently vibrating, or by playing a specific pre-assigned melody for a particular caller.

The keypad 828 couples to the DSP 802 via the interface 818 to provide one mechanism for the user to make selections, enter information, and otherwise provide input to the UE 10. The keyboard 828 may be a full or reduced alphanumeric keyboard such as QWERTY, Dvorak, AZERTY and sequential types, or a traditional numeric keypad with alphabet letters associated with a telephone keypad. The input keys may include a trackwheel, an exit or escape key, a trackball, and other navigational or functional keys, which may be inwardly depressed to provide further input function. Another input mechanism may be the LCD 830, which may include touch screen capability and also display text and/or graphics to the user. The LCD controller 832 couples the DSP 802 to the LCD 830.

The CCD camera 834, if equipped, enables the UE 10 to take digital pictures. The DSP 802 communicates with the CCD camera 834 via the camera controller 836. In another embodiment, a camera operating according to a technology other than Charge Coupled Device cameras may be employed. The GPS sensor 838 is coupled to the DSP 802 to decode global positioning system signals, thereby enabling the UE 10 to determine its position. Various other peripherals may also be included to provide additional functions, e.g., radio and television reception.

Figure 12:
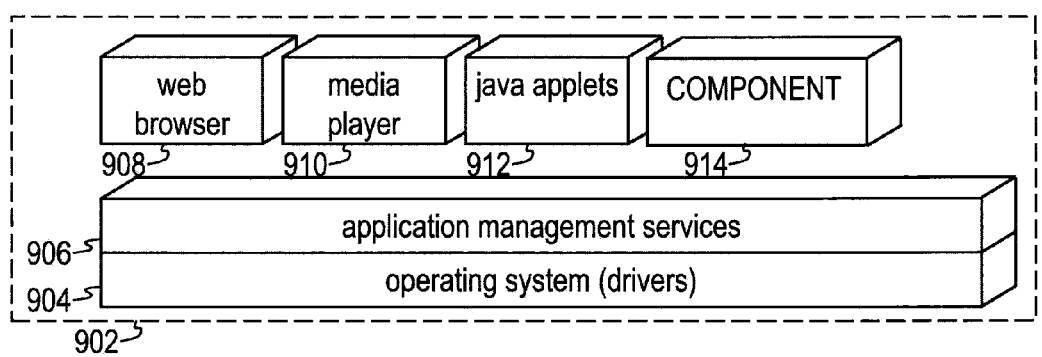
FIG. 12 is a diagram of a software environment that may be implemented on a UE operable for some of the various embodiments of the disclosure.

FIG. 12 illustrates a software environment 902 that may be implemented by the DSP 802. The DSP 802 executes operating system drivers 904 that provide a platform from which the rest of the software operates. The operating system drivers 904 provide drivers for the UE hardware with standardized interfaces that are accessible to application software. The operating system drivers 904 include application management services (AMS) 906 that transfer control between applications running on the UE 10. Also shown in FIG. 12 are a web browser application 908, a media player application 910, and Java applets 912. The web browser application 908 configures the UE 10 to operate as a web browser, allowing a user to enter information into forms and select links to retrieve and view web pages. The media player application 910 configures the UE 10 to retrieve and play audio or audiovisual media. The Java applets 912 configure the UE 10 to provide games, utilities, and other functionality. A component 914 might provide functionality described herein.

Figure 13:
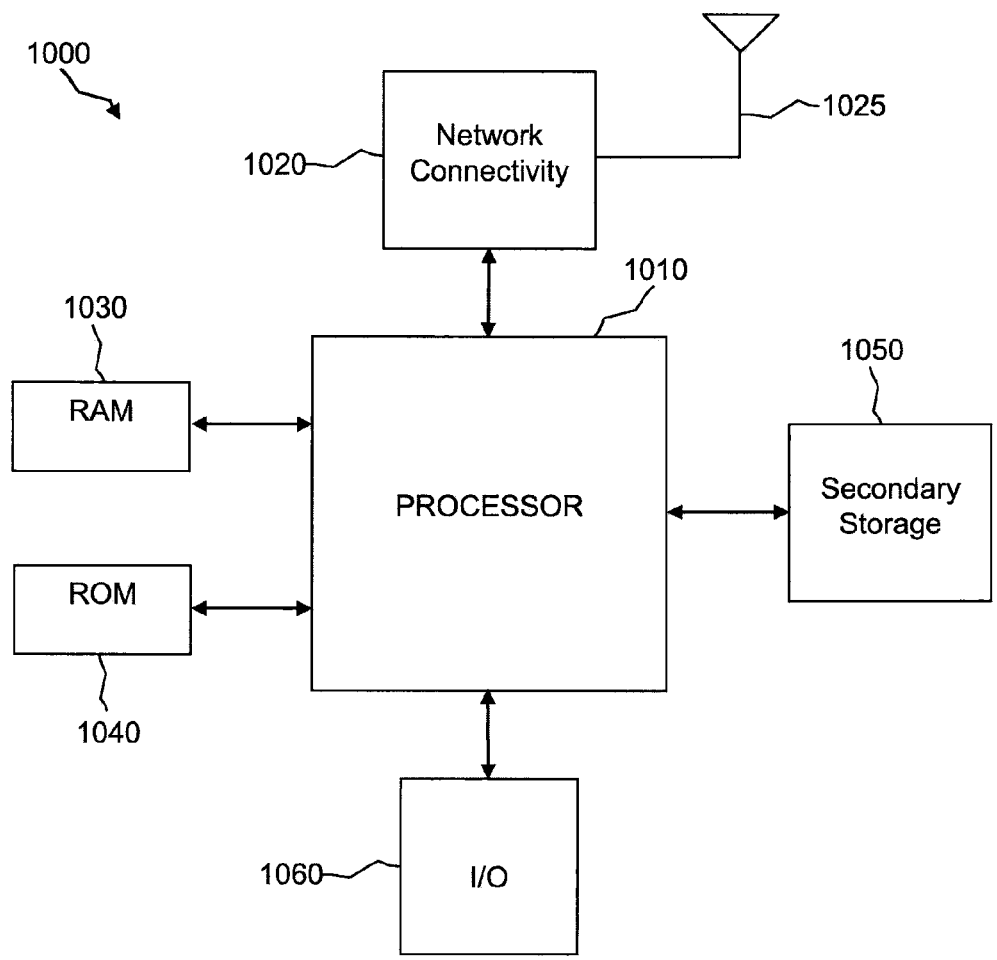
FIG. 13 is an illustrative general purpose computer system suitable for some of the various embodiments of the disclosure.

The UE 10, base station 120, and other components described above might include a processing component that is capable of executing instructions related to the actions described above. FIG. 13 illustrates an example of a system 1000 that includes a processing component 1010 suitable for implementing one or more embodiments disclosed herein. In addition to the processor 1010 (which may be referred to as a central processor unit (CPU or DSP), the system 1000 might include network connectivity devices 1020, random access memory (RAM) 1030, read only memory (ROM) 1040, secondary storage 1050, and input/output (I/O) devices 1060. In some cases, some of these components may not be present or may be combined in various combinations with one another or with other components not shown. These components might be located in a single physical entity or in more than one physical entity. Any actions described herein as being taken by the processor 1010 might be taken by the processor 1010 alone or by the processor 1010 in conjunction with one or more components shown or not shown in the drawing.

The processor 1010 executes instructions, codes, computer programs, or scripts that it might access from the network connectivity devices 1020, RAM 1030, ROM 1040, or secondary storage 1050 (which might include various disk-based systems such as hard disk, floppy disk, or optical disk). While only one processor 1010 is shown, multiple processors may be present. Thus, while instructions may be discussed as being executed by a processor, the instructions may be executed simultaneously, serially, or otherwise by one or multiple processors. The processor 1010 may be implemented as one or more CPU chips.

The network connectivity devices 1020 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WiMAX) devices, and/or other well-known devices for connecting to networks. These network connectivity devices 1020 may enable the processor 1010 to communicate with the Internet or one or more telecommunications networks or other networks from which the processor 1010 might receive information or to which the processor 1010 might output information.

The network connectivity devices 1020 might also include one or more transceiver components 1025 capable of transmitting and/or receiving data wirelessly in the form of electromagnetic waves, such as radio frequency signals or microwave frequency signals. Alternatively, the data may propagate in or on the surface of electrical conductors, in coaxial cables, in waveguides, in optical media such as optical fiber, or in other media. The transceiver component 1025 might include separate receiving and transmitting units or a single transceiver. Information transmitted or received by the transceiver 1025 may include data that has been processed by the processor 1010 or instructions that are to be executed by processor 1010. Such information may be received from and outputted to a network in the form, for example, of a computer data baseband signal or signal embodied in a carrier wave. The data may be ordered according to different sequences as may be desirable for either processing or generating the data or transmitting or receiving the data. The baseband signal, the signal embedded in the carrier wave, or other types of signals currently used or hereafter developed may be referred to as the transmission medium and may be generated according to several methods well known to one skilled in the art.

The RAM 1030 might be used to store volatile data and perhaps to store instructions that are executed by the processor 1010. The ROM 1040 is a non-volatile memory device that typically has a smaller memory capacity than the memory capacity of the secondary storage 1050. ROM 1040 might be used to store instructions and perhaps data that are read during execution of the instructions. Access to both RAM 1030 and ROM 1040 is typically faster than to secondary storage 1050. The secondary storage 1050 is typically comprised of one or more disk drives or tape drives and might be used for non-volatile storage of data or as an over-flow data storage device if RAM 1030 is not large enough to hold all working data. Secondary storage 1050 may be used to store programs that are loaded into RAM 1030 when such programs are selected for execution.

The I/O devices 1060 may include liquid crystal displays (LCDs), touch screen displays, keyboards, keypads, switches, dials, mice, track balls, voice recognizers, card readers, paper tape readers, printers, video monitors, or other well-known input/output devices. Also, the transceiver 1025 might be considered to be a component of the I/O devices 1060 instead of or in addition to being a component of the network connectivity devices 1020. Some or all of the I/O devices 1060 may be substantially similar to various components depicted in the previously described drawing of the UE 10, such as the display 702 and the input 704.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and may be made without departing from the spirit and scope disclosed herein.

To apprise the public of the scope of this invention, the following claims are made:

1. A method of implementing call handover (HO) using a user equipment (UE) configured to communicate with a wireless communication network, comprising:
   transmitting a measurement report to a serving cell and at least one cell of a coordinated multi-point (CoMP) set, the measurement report including the downlink (DL) signal quality indication of the one or more cells in the CoMP set;
   after transmitting the measurement report, listening by the UE for a handover (HO) command;
   receiving a resource allocation;
   receiving a first HO command over a first physical data control channel (PDCCH) with the serving cell, the first HO command identifying a target cell;
   receiving a second HO command over a second PDCCH of a first cell in the CoMP cell set, the second PDCCH being different from the first PDDCH, the second HO command identifying said target cell; and
   performing handover to the target cell identified in both the received first HO and received second HO command.

2. The method of claim 1, wherein the first cell in the CoMP cell set consists of a cell having the highest DL radio signal level in the measurement report.

3. The method of claim 2, wherein the target cell is not the first cell in the CoMP cell set.

4. The method of claim 1, wherein, when the first cell in the CoMP cell set is the same as the target cell, the serving cell is configured to forward a handover command message (HCM) allocation to the first cell in the CoMP cell.

5. The method of claim 1, wherein the serving cell and the first cell in the CoMP cell set are configured to use an exclusive CoMP set Cell Radio Network Temporary Identifier (C-RNTI) to encode the HO command.

6. The method of claim 5, including using the exclusive CoMP set C-RNTI to decode messages received from at least one of the serving cell and the first cell in the CoMP cell set.

7. The method of claim 1, wherein the cells in the CoMP cell set are configured to forward the measurement report to the serving cell using an X2 interface.

8. A method of implementing call handover (HO) using a base station configured to communicate with a wireless communication network, comprising:
   receiving a measurement report from at least one of a user equipment (UE) and a cell in a coordinated multi-point (CoMP) cell set, the measurement report including a downlink (DL) signal level between one or more cells of the CoMP cell set and the UE;
   transmitting at least one of a DL allocation for a handover command message (HCM) and an HCM context to a first cell in the CoMP cell set; and
   transmitting simultaneously with the first cell in the CoMP cell set an HO command to the UE, the HO command identifying a target cell and wherein the target cell is not the first cell in the CoMP cell set.

9. The method of claim 8, wherein the first cell in the CoMP cell set consists of a cell having the highest DL radio signal level in the measurement report.

10. The method of claim 9, including forwarding a handover command message (HCM) context to the first cell in the CoMP cell set, the HCM context identifying the target cell.

11. The method of claim 8, including using an exclusive CoMP set Cell Radio Network Temporary Identifier (C-RNTI) to encode the HO command.

12. The method of claim 8, including receiving the measurement report from one or more of the plurality of cells in the CoMP cell set using an X2 interface.

13. The method of claim 12, including, when a measurement report is received from the UE at a first time, discarding measurement reports received using the X2 interface after the first time.

14. A method of implementing call handover (HO) using one of a plurality of cells of a coordinated multi-point (CoMP) cell set configured to communicate with a wireless communication network, comprising:
   receiving at least one of a downlink (DL) allocation for a handover command message (HCM) and an HCM context from a serving cell;
   receiving the handover command message (HCM) context from the serving cell, the HCM context identifying the target cell; and
   transmitting simultaneously by the serving cell and a first cell in the CoMP cell set a first HO command and a second HO command, respectively to a user equipment (UE), the first HO command and the second HO command identifying a target cell.

15. The method of claim 14, including using an exclusive CoMP set Cell Radio Network Temporary Identifier (C-RNTI) to encode the HO command.

16. The method of claim 14, including, when the target cell is not the first cell in the CoMP cell set, receiving a handover command message (HCM) context from the serving cell, the HCM context identifying the target cell.

17. A user equipment (UE) configured to implement call handover (HO), comprising:
   a processor, the processor being configured to:
      transmit a measurement report to a serving cell and at least one cell of a coordinated multi-point (CoMP) cell set, the measurement report including a downlink (DL) signal quality indication of one or more cells in the (CoMP) cell set;
      after the measurement report is transmitted, listen for a first handover (HO) command;
      receive a resource allocation;
      receive a first HO command over a first physical data control channel (PDCCH) with a serving cell, the first HO command identifying a target cell;

receive a second HO command over a second PDCCH, the second PDCCH being different from the first PDCCH, the second HO command identifying said target cell; and perform handover to the target cell identified in both the received first HO and received second HO command.

18. The UE of claim 17, wherein the first cell in the CoMP cell set consists of a cell having the highest DL radio signal level in the measurement report.

19. The UE of claim 18, wherein the target cell is not the first cell in the CoMP cell set.

20. A base station configured to implement call handover (HO), comprising:
a processor, the processor being configured to:
receive a measurement report from at least one of a user equipment (UE) and a cell in a coordinated multi-point (CoMP) cell set, the measurement report including a downlink (DL) signal level between one or more cells of the CoMP cell set and the UE;
transmit at least one of a DL allocation for a handover command message (HCM) and an HCM context to a first cell in the CoMP cell set; and
transmit a first HO command to the UE simultaneously with a second HO command from the first cell in the CoMP cell set, the first HO command and the second HO command identifying a target cell and wherein the target cell is not the first cell in the CoMP cell set.

21. The base station of claim 20, wherein the first cell in the CoMP cell set consists of a cell having the highest DL radio signal level in the measurement report.

22. The base station of claim 21, wherein the target cell is not the first cell in the CoMP cell set and the processor is configured to forward a handover command message (HCM) context to the first cell in the CoMP cell set, the HCM context identifying the target cell.

23. The base station of claim 20, wherein the processor is configured to use an exclusive CoMP set Cell Radio Network Temporary Identifier (C-RNTI) to encode the HO command.

24. A base station configured to implement call handover (HO), comprising:
a processor, the processor being configured to:
receive at least one of a downlink (DL) allocation for a handover command message (HCM) and an HCM context from a serving cell;
receive the handover command message (HCM) context from the serving cell, the HCM context identifying the target cell; and
transmit a first HO command simultaneously with a second HO command from the serving cell an HO command to a user equipment (UE), the first HO command and the second HO command identifying a target cell.

25. The base station of claim 24, wherein the processor is configured to use an exclusive CoMP set Cell Radio Network Temporary Identifier (C-RNTI) to encode the HO command.

26. The base station of claim 24, wherein the processor is configured to, when the target cell is not the first cell in the CoMP cell set, receive a handover command message (HCM) context from the serving cell, the HCM context identifying the target cell.

27. A method of implementing call handover (HO) using a base station configured to communicate with a wireless communication network, comprising:
receiving a measurement report from at least one of a user equipment (UE) and a cell in a coordinated multi-point (CoMP) cell set, the measurement report including a downlink (DL) signal level between one or more cells of the CoMP cell set and the UE and when a measurement report is received from the UE at a first time, discarding measurement reports received using the X2 interface after the first time;
transmitting at least one of a DL allocation for a handover command message (HCM) and an HCM context to a first cell in the CoMP cell set; and
transmitting an HO command to the UE, the HO command identifying a target cell.

\* \* \* \* \*